United States Patent

Suzuki

(10) Patent No.: US 9,941,824 B2
(45) Date of Patent: Apr. 10, 2018

(54) ELECTRIC WORKING MACHINE AND METHOD FOR DETECTING ROTATIONAL POSITION OF ROTOR OF BRUSHLESS MOTOR FOR ELECTRIC WORKING MACHINE

(71) Applicant: MAKITA CORPORATION, Anjo-shi, Aichi (JP)

(72) Inventor: Hitoshi Suzuki, Anjo (JP)

(73) Assignee: MAKITA CORPORATION, Anjo-shi (JP)

(*) Notice: Subject to any disclaimer, the term of this patent is extended or adjusted under 35 U.S.C. 154(b) by 0 days.

(21) Appl. No.: 15/413,918

(22) Filed: Jan. 24, 2017

(65) Prior Publication Data

US 2017/0222582 A1 Aug. 3, 2017

(30) Foreign Application Priority Data

Jan. 29, 2016 (JP) .................................. 2016-016197

(51) Int. Cl.
*H02P 6/16* (2016.01)
*H02P 6/15* (2016.01)
*H02P 6/12* (2006.01)
*A01D 69/02* (2006.01)

(52) U.S. Cl.
CPC ............... *H02P 6/157* (2016.02); *A01D 69/02* (2013.01); *H02P 6/12* (2013.01)

(58) Field of Classification Search
CPC .................................... H02P 6/157; H02P 6/12
USPC ....................................................... 318/400.04
See application file for complete search history.

(56) References Cited

U.S. PATENT DOCUMENTS

| 2003/0210006 | A1* | 11/2003 | Kusaka | ...................... H02P 1/46 318/437 |
| 2010/0264862 | A1* | 10/2010 | Kitagawa | ................... H02P 6/16 318/400.13 |
| 2013/0113400 | A1* | 5/2013 | Kishimoto | ................ H02P 6/16 318/400.14 |

FOREIGN PATENT DOCUMENTS

JP      H03-190684 A      8/1991

* cited by examiner

*Primary Examiner* — Erick Glass
(74) *Attorney, Agent, or Firm* — Oliff PLC

(57) ABSTRACT

An electric working machine according to one aspect of the present disclosure comprises a brushless motor, a rotational position sensor, a detector, and a calculator. The calculator detects, when the brushless motor is inertially rotated, a difference between a detection result obtained by the rotational position sensor and a detection result obtained by the detector and calculates a correction value, based on the difference, for correcting the detection result obtained by the rotational position sensor.

13 Claims, 13 Drawing Sheets

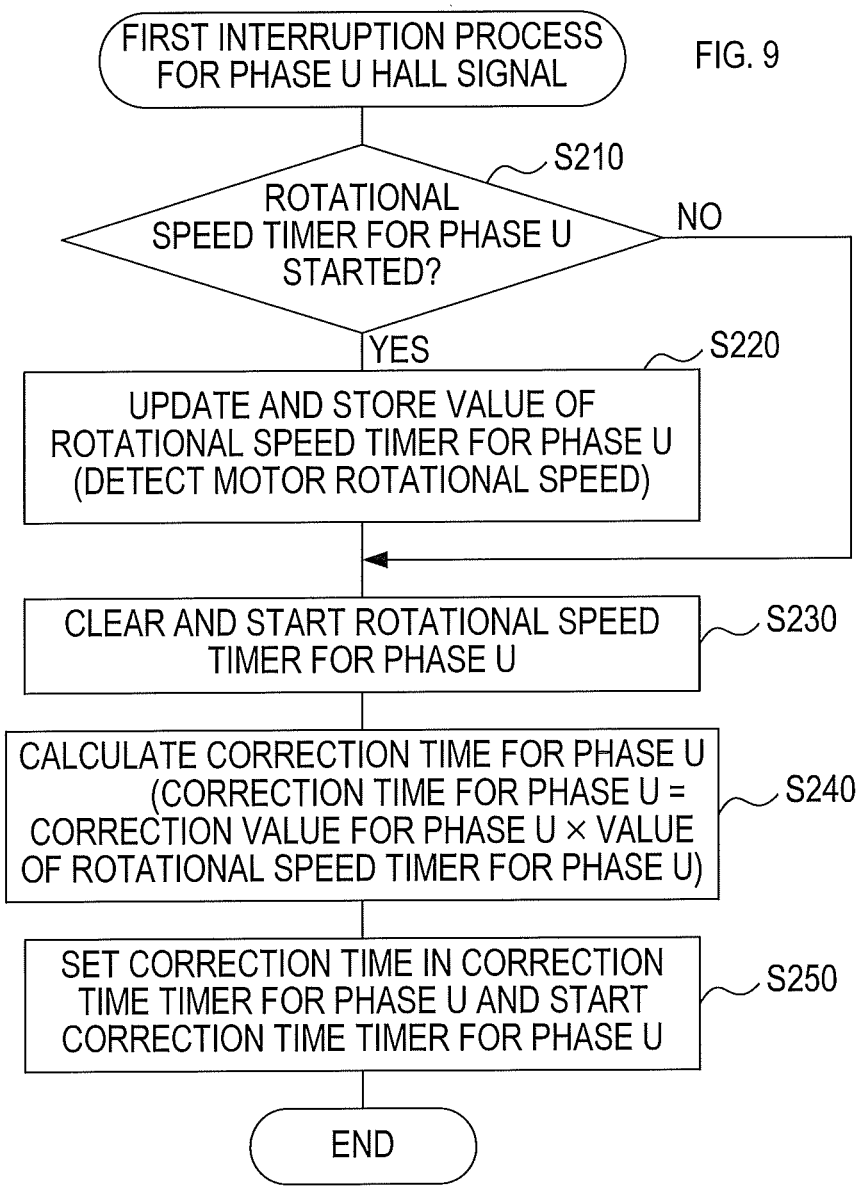

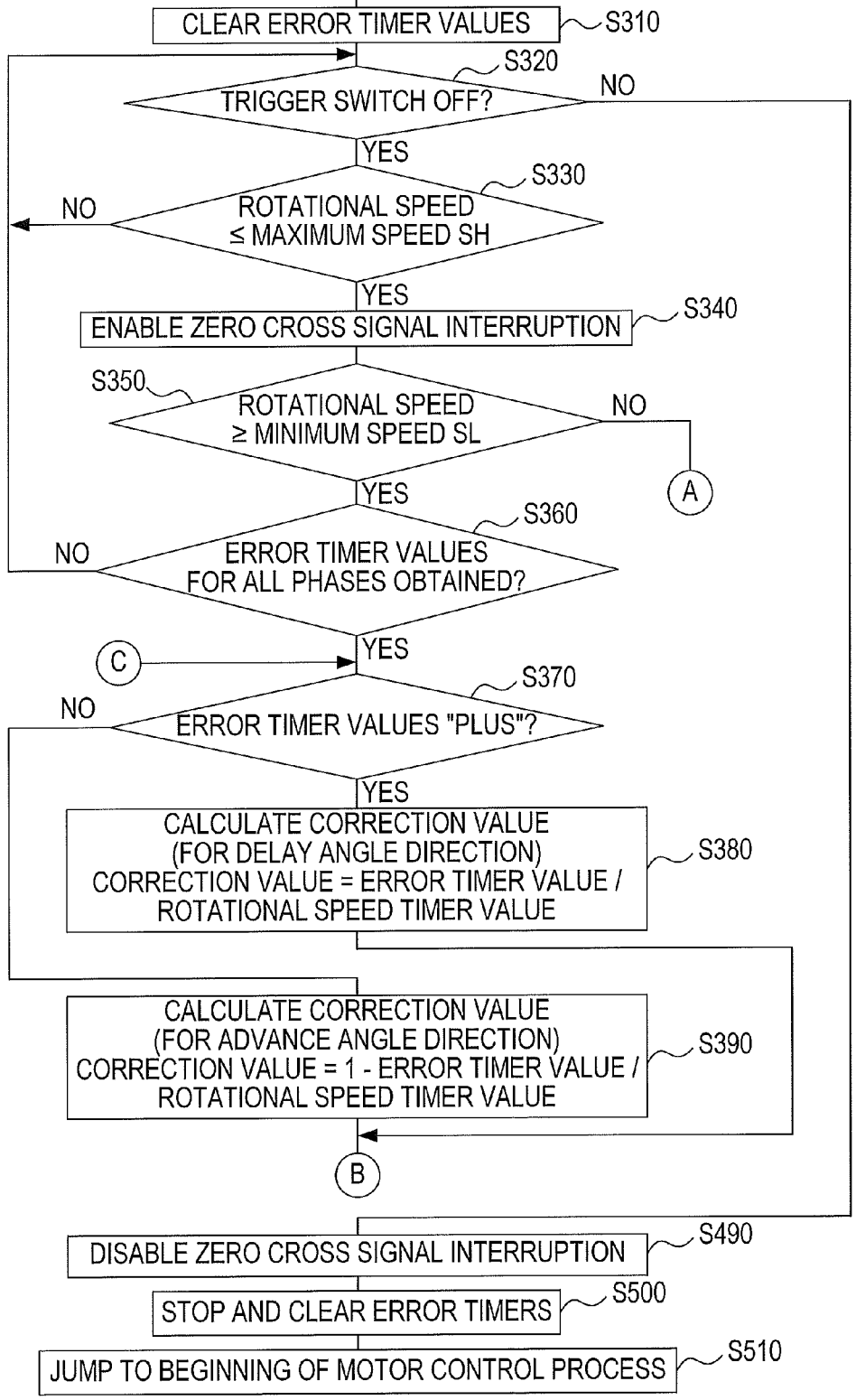

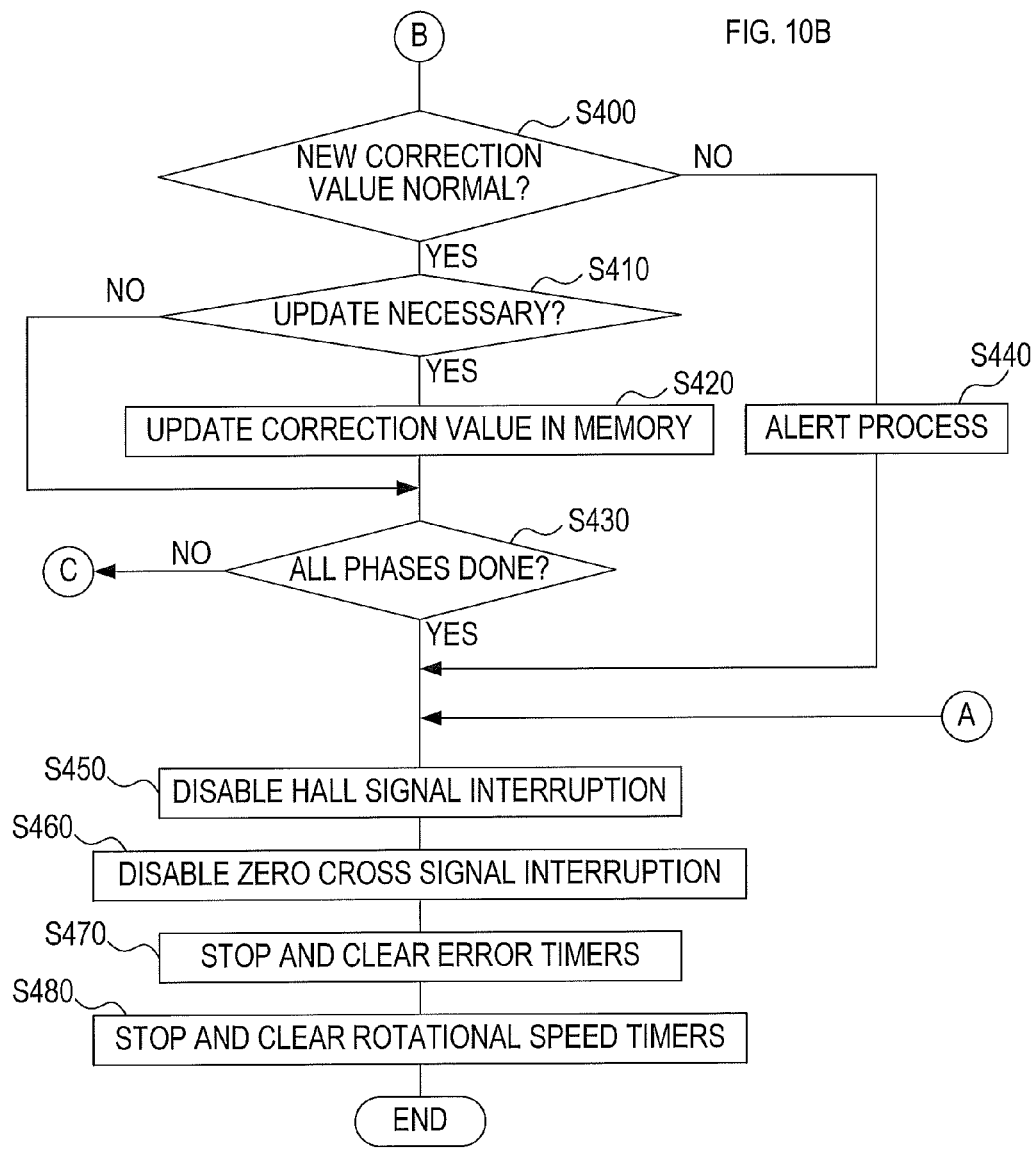

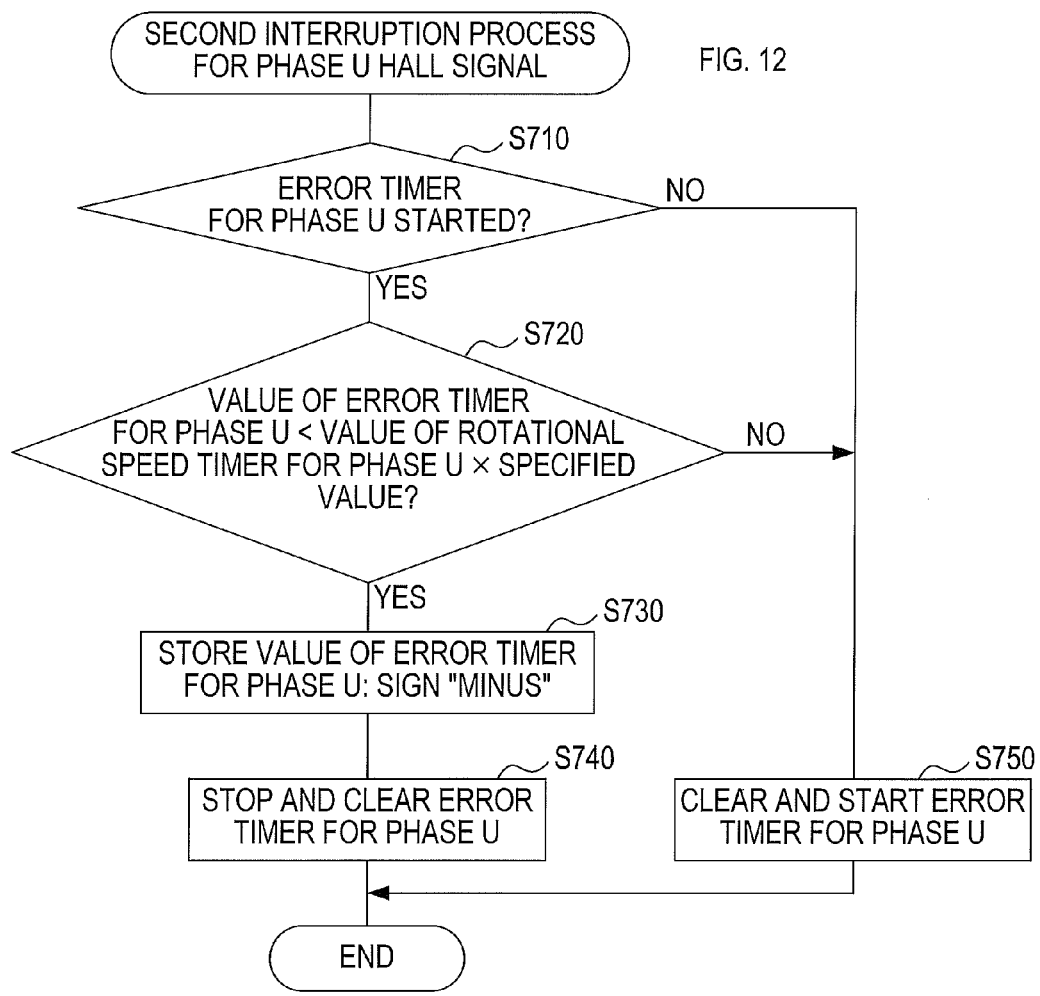

ELECTRIC WORKING MACHINE AND METHOD FOR DETECTING ROTATIONAL POSITION OF ROTOR OF BRUSHLESS MOTOR FOR ELECTRIC WORKING MACHINE

CROSS-REFERENCE TO RELATED APPLICATION

The subject application claims the benefit of the Japanese Patent Application No. 2016-016197 filed on Jan. 29, 2016 with the Japan Patent Office, and the entire disclosure of which is incorporated herein by reference.

BACKGROUND

The present disclosure is related to an electric working machine comprising a brushless motor.

Japanese Unexamined Patent Application Publication No. H3-190684 discloses a rechargeable tool such as a rechargeable drill and a rechargeable driver. This rechargeable tool is configured to detect a rotational position of the rotor of the brushless motor by Hall elements installed in the brushless motor, and to control the brushless motor based on the result of the detection.

SUMMARY

To control the brushless motor, one of the plurality of windings of the stator is selectively energized corresponding to the rotational position of the rotor (hereinafter also simply referred to as rotational position). Thus, to exhibit the actual performance of the brushless motor, detection errors of rotational positions have to be minimized.

In the rotational position sensor including Hall elements, due to the assembly error of the rotational position sensor (that is, error in the assembling position), detection errors of rotational positions are caused. The magnitude of such detection errors increases with the magnitude of the assembly error, or with the number of the magnetic poles of the brushless motor (specifically, the magnetic poles of the rotor). A detection error of a rotational position obtained by the rotational position sensor is "A°×B/2" in the electrical angle, in which the assembly error of the rotational position sensor is "A°" in the mechanical angle, and the number of the magnetic poles of the brushless motor is "B".

Thus, even if the assembly error of the rotational position sensor can be reduced, detection errors of rotational positions may be increased to influence the control of the brushless motor in a case wherein, for example, the brushless motor comprises many magnetic poles for high output.

Accordingly, it is preferable that one aspect of the present disclosure can correct a detection of a rotational position of a rotor of a brushless motor for an electric working machine in an accurate manner.

One aspect of the present disclosure provides an electric working machine comprising a brushless motor, a rotational position sensor, a detector, a calculator, and a memory processor.

The brushless motor comprises a rotor and a stator having a plurality of windings. The rotational position sensor detects a rotational position of the rotor based on a variation in a magnetic field associated with rotation of the rotor. The detector detects the rotational position of the rotor based on induced voltages individually generated in each of the plurality of windings.

The calculator detects, when the brushless motor is inertially rotated, a difference between a detection result obtained by the rotational position sensor and a detection result obtained by the detector and calculates a correction value, based on the difference, for correcting the detection result obtained by the rotational position sensor.

In the rotational position sensor, a detection error is caused due to an assembly error of the rotational position sensor. However, with a detection technique in which the rotational position is detected based on the induced voltages, a detection error due to the assembly error is not caused or is reduced. Moreover, since the induced voltages are influenced by a magnetic field generated by electric current (that is, excitation electric current) flowing in each of the plurality of windings, the rotational position is not accurately indicated when the brushless motor is driven. Nevertheless, the rotational position is accurately indicated when the brushless motor is inertially rotated. Consequently, the detection result obtained by the detector, when the brushless motor is inertially rotated, supposedly indicates an accurate rotational position. Thus, the calculator detects, when the brushless motor is inertially rotated, the difference between the detection result obtained by the rotational position sensor and the detection result obtained by the detector and calculates the correction value from the difference.

The electric working machine as configured above can calculate the correction value that can accurately correct the detection result obtained by the rotational position sensor. Accordingly, the detection result obtained by the rotational position sensor can be accurately corrected with the correction value calculated. The plurality of windings may be formed with a single electric wire, or with a plurality of electric wires. The electric working machine may comprise a memory processor that stores the correction value calculated by the calculator in a memory. In the electric working machine as described above, the detection result obtained by the rotational position sensor can be accurately corrected with the correction value stored in the memory.

The calculator may be configured to detect a time lag, as the difference, between a first timing in which the rotational position sensor detects a specified rotational position of the rotor and a second timing in which the detector detects the specified rotational position when the brushless motor is inertially rotated.

The electric working machine as configured above can easily detect the difference between the detection result obtained by the rotational position sensor and the detection result obtained by the detector, and consequently can simplify the process to calculate the correction value.

The electric working machine may further comprise a motor controller. The motor controller controls the brushless motor based on the detection result obtained by the rotational position sensor. The motor controller may be configured to correct the detection result obtained by the rotational position sensor with the correction value stored in the memory for controlling the brushless motor.

The electric working machine as configured above can improve the control accuracy of the brushless motor. The calculator may be configured to detect the difference if rotational speed of the brushless motor is equal to a specified minimum speed or higher. If the rotational speed is too low, the amplitude of the induced voltages to be generated become small, which makes accurate detection of the rotational position difficult from the induced voltages.

The electric working machine as configured above can improve the accuracy of the correction value calculated by the calculator. The calculator may be configured to detect the difference if the rotational speed of the brushless motor is equal to the minimum speed or higher and additionally equal to a specified maximum speed or lower, the maximum speed being higher than the minimum speed. If the rotational speed is too high, a change rate of the induced voltages to be generated becomes large, which makes accurate detection of the rotational position difficult from the induced voltages.

The electric working machine as configured above can detect the difference in the range of the rotational speed where the accuracy of the detection of the rotational position obtained by the detector is preferable. Accordingly, the accuracy of the correction value calculated by the calculator can be further improved.

The electric working machine may further comprise an update determiner. The update determiner compares the correction value in the memory and the correction value newly calculated by the calculator and determines whether to update the correction value in the memory. The memory processor may be configured to update the correction value in the memory with the correction value newly calculated if the update determiner determines to update the correction value in the memory.

In the electric working machine as configured above, the memory processor does not have to update the correction value in the memory every time the correction value is newly calculated. This enables to reduce the process load to rewrite the correction value in the memory and the number of rewriting the memory.

The electric working machine may further comprise an abnormality detector. The abnormality detector determines, based on whether the correction value calculated by the calculator is within a specified range, whether the correction value calculated by the calculator is normal and, if the correction value calculated by the calculator is determined not to be normal, performs a process to alert a user of the electric working machine to occurrence of an abnormality. The specified range may be set to a normal range for design (that is, a range available in the standpoint of the design).

The electric working machine as configured above can, for example, detect the correction value calculated by the calculator being an abnormal value, due to the occurrence of an abnormality in any of the rotational position sensor and the detector and alert the user. The user can be encouraged thereby to repair the electric working machine.

Another aspect of the present disclosure provides, a method for detecting a rotational position of a rotor of a brushless motor for an electric working machine, the brushless motor comprising the rotor and a stator having a plurality of windings. The method comprises: detecting the rotational position of the rotor based on variation in a magnetic field associated with rotation of the rotor; detecting the rotational position of the rotor based on induced voltages individually generated in each of the plurality of windings; detecting, when the brushless motor is inertially rotated, a difference between a detection result based on the variation in the magnetic field and a detection result based on the induced voltages; and calculating, based on the difference, a correction value to correct the detection result based on the variation in the magnetic field.

The method as described above enables a correction value to be calculated such that the correction value can accurately correct the detection result based on the variation in the magnetic field. Therefore, the detection result based on the variation in the magnetic field can be accurately corrected with the correction value calculated.

BRIEF DESCRIPTION OF THE DRAWINGS

The example embodiment according to the present disclosure will now be described by way of example with reference to the accompanying drawings, in which:

FIG. 9 is a flowchart illustrating a first interruption process for Phase U Hall signal;

FIG. 10A is a flowchart illustrating a part of a correction value storing process;

FIG. 10B is a flowchart illustrating the remainder of the correction value storing process;

FIG. 12 is a flowchart illustrating a second interruption process for Phase U Hall signal.

DETAILED DESCRIPTION OF THE PREFERRED EMBODIMENTS

In the present embodiment, a trimmer will be described as one example of an electric working machine.

[General Structure of Trimmer]

Figure 1:
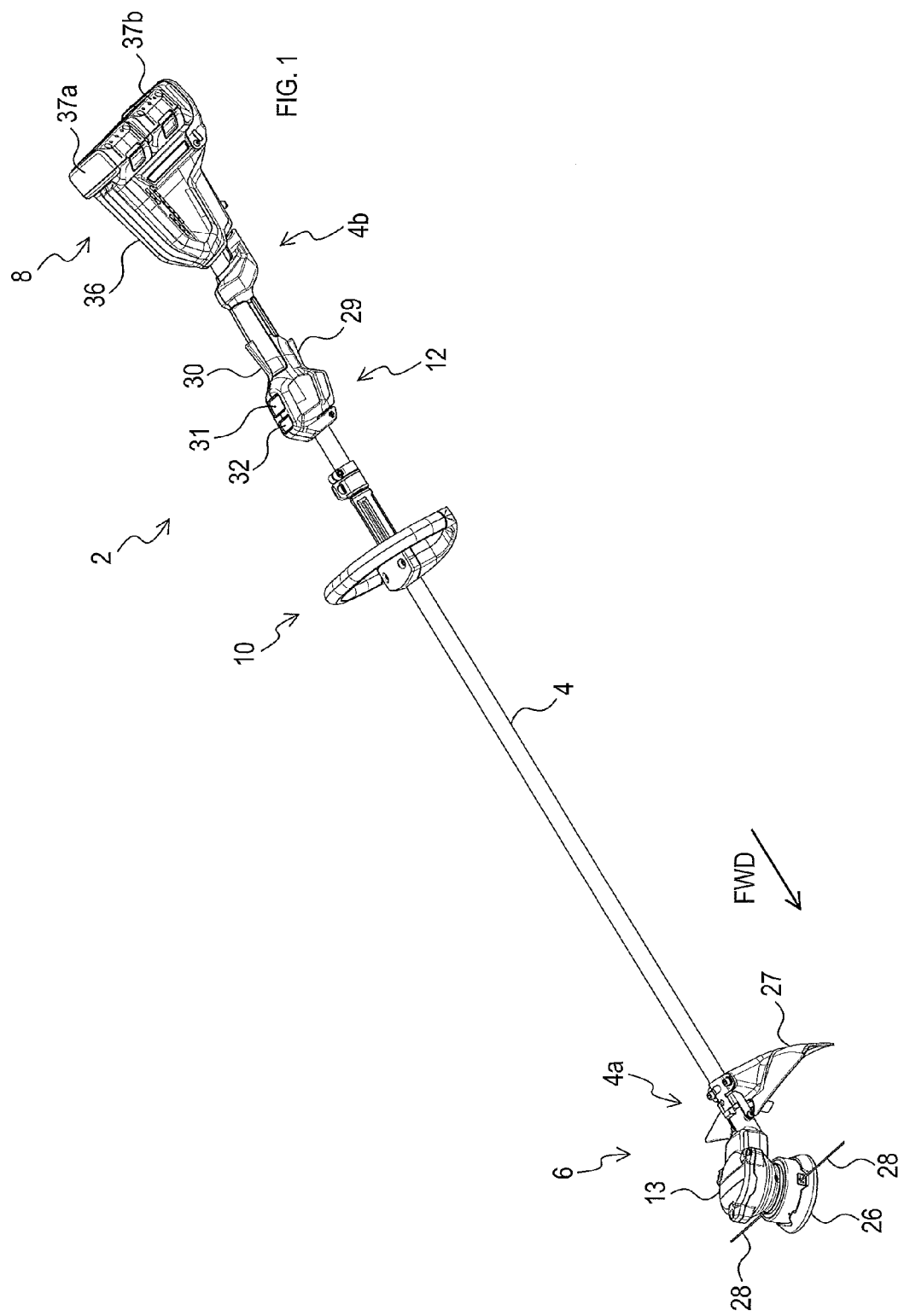
FIG. 1 is a perspective view showing a trimmer according to an embodiment.

As shown in FIG. 1, a trimmer 2 according to the present embodiment is an electric working machine for gardening used for trimming plants. The trimmer 2 comprises a supporting pipe 4, a front end unit 6 disposed on a front end 4a of the supporting pipe 4, a rear end unit 8 disposed on a rear end 4b of the supporting pipe 4, a loop handle 10 disposed in a middle portion of the supporting pipe 4, a grip 12 disposed between the loop handle 10 and the rear end unit 8. The supporting pipe 4 is a hollow pipe extending from the front end 4a to the rear end 4b in a linear manner.

Figure 2:
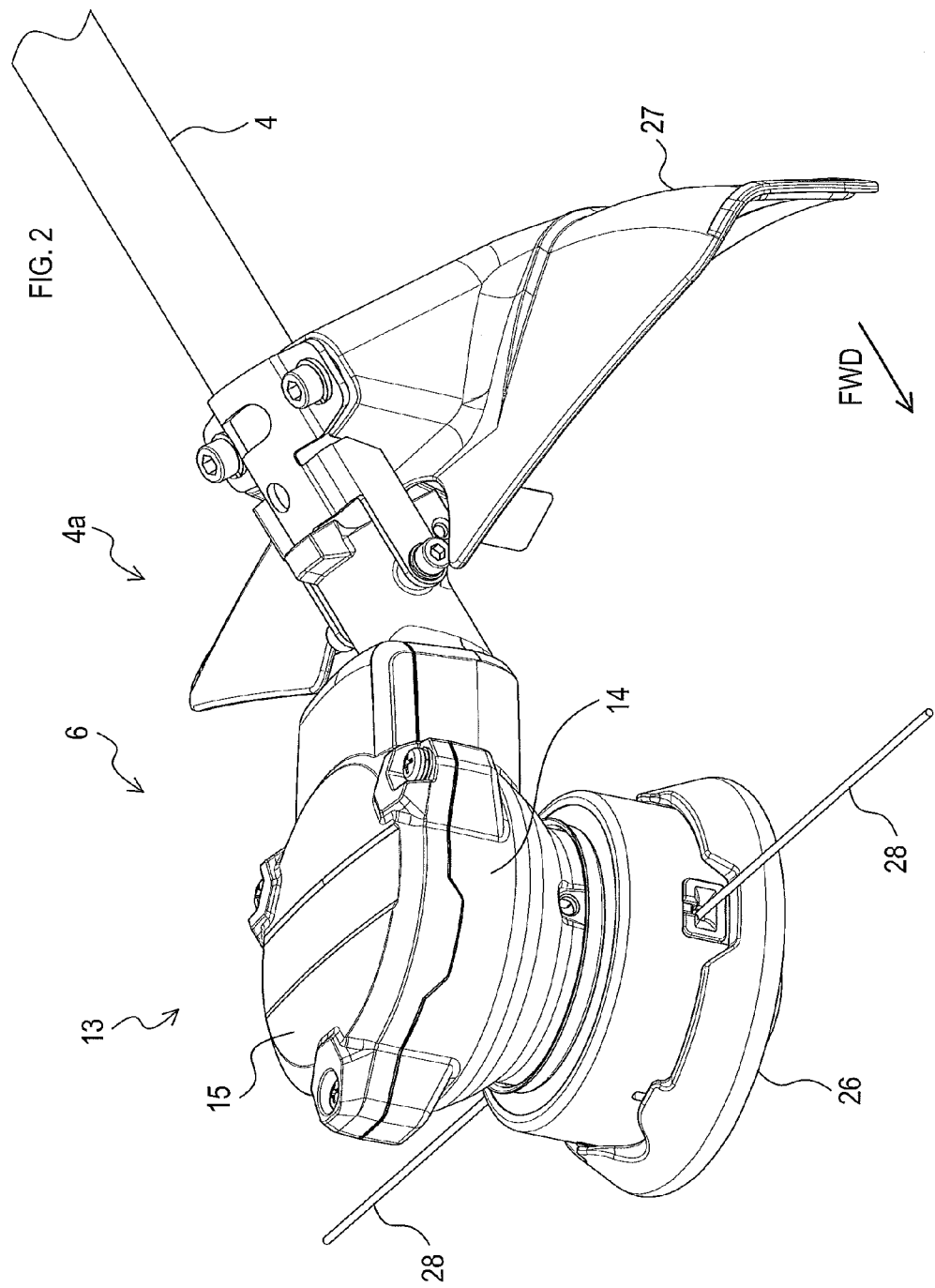
FIG. 2 is a perspective view showing front end unit.

As shown in FIG. 2, the front end unit 6 comprises a motor housing 13. The motor housing 13 comprises a housing body 14, having an open top portion, and a top surface cover 15 that covers the open top portion of the housing body 14.

Figure 3:
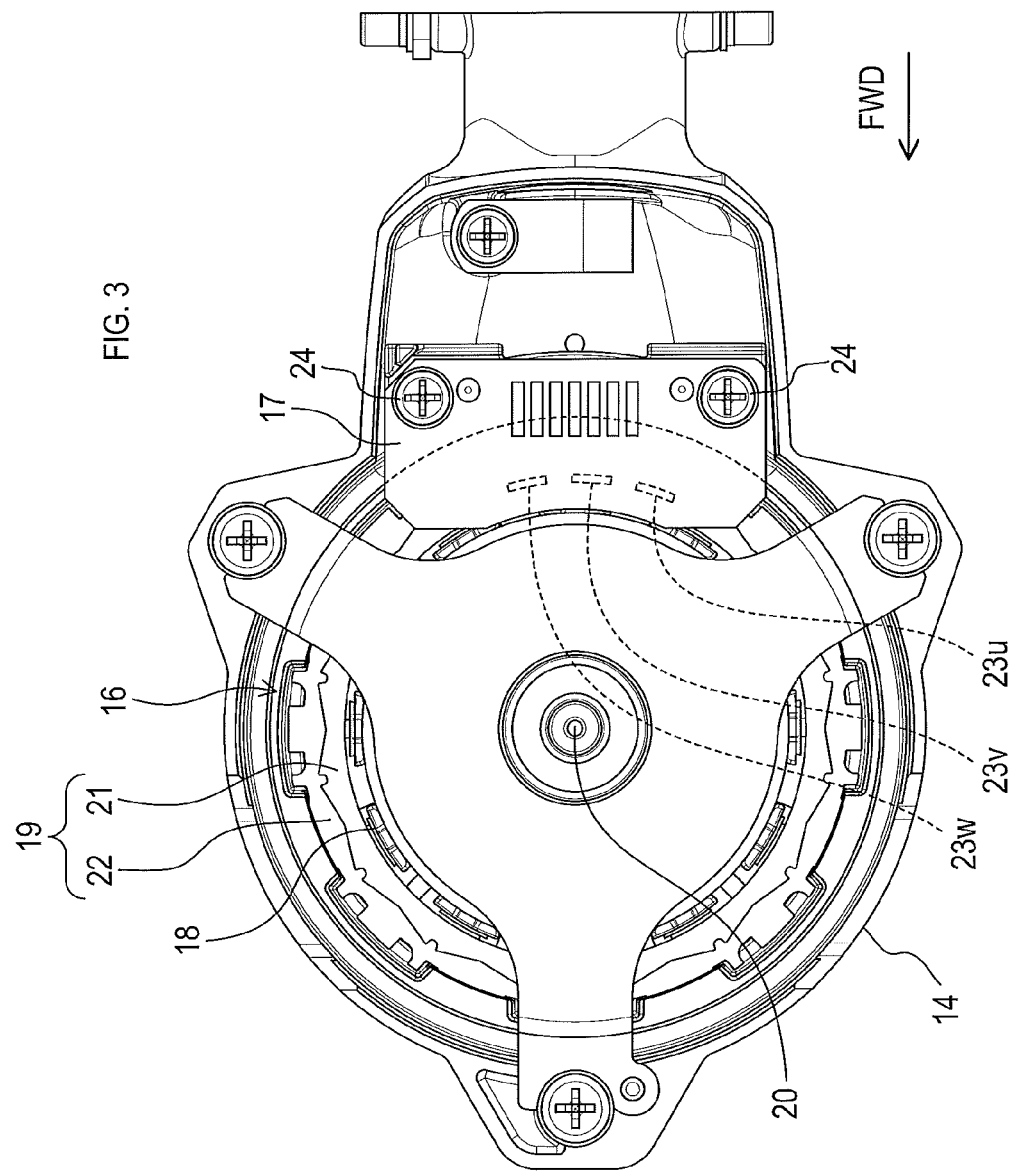
FIG. 3 is a plan view showing the front end unit without a top surface cover thereof.

As shown in FIG. 3, the housing body 14 houses, inside thereof, a motor 16 as a drive source, and a sensor board 17. The motor 16 is a three-phase brushless motor with an outer-rotor configuration and comprises a stator 18, a rotor 19, and a motor shaft 20 coupled with the rotor 19.

Figure 5:
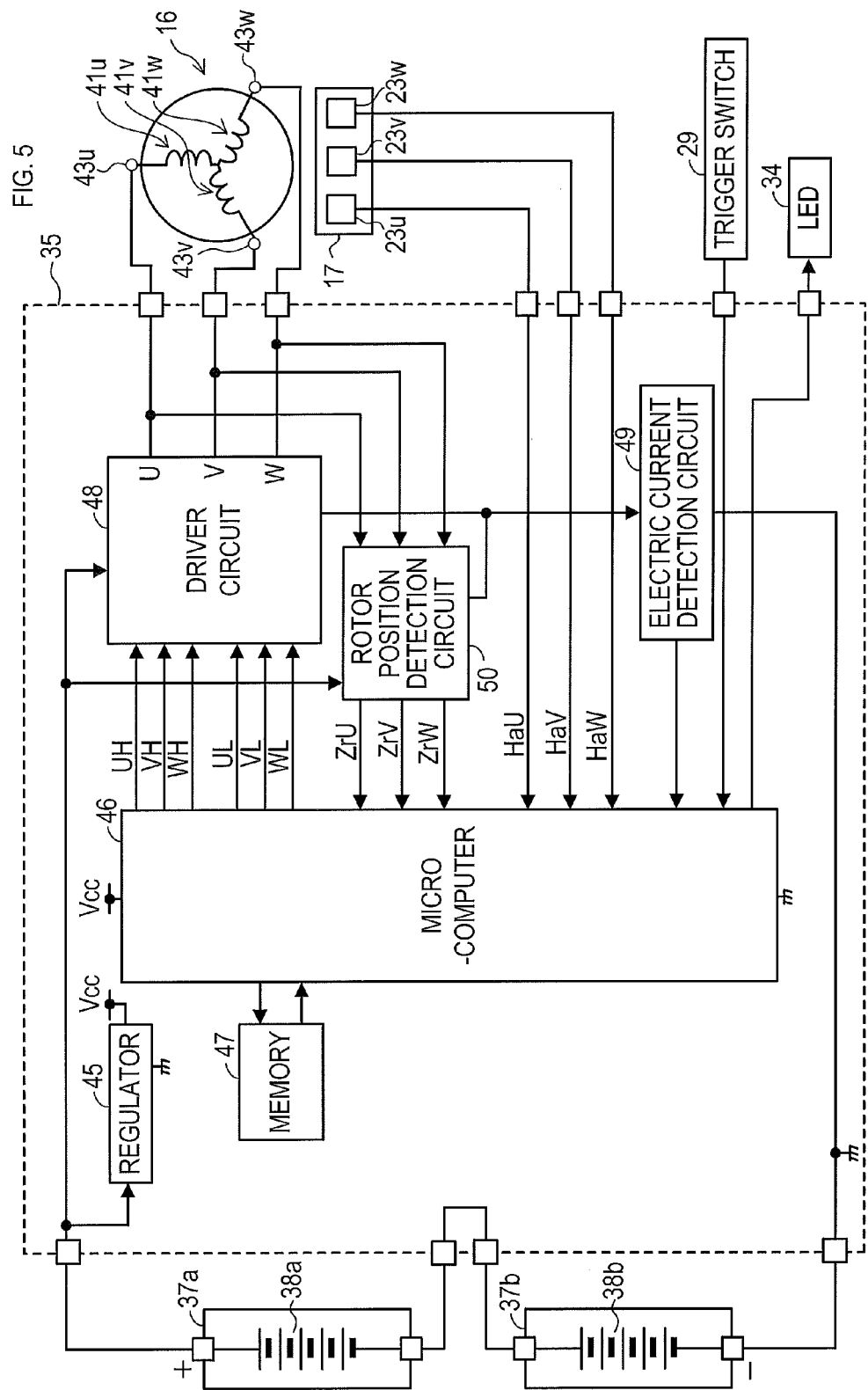
FIG. 5 is a configuration diagram showing a configuration of a control device.

The stator 18 comprises a Phase U coil (that is, a winding) 41u, a Phase V coil 41v, and a Phase W coil 41w (see FIG. 5). The stator 18 is secured to the housing body 14, and the rotor 19 and the motor shaft 20 rotate with respect to the stator 18.

Figure 4:
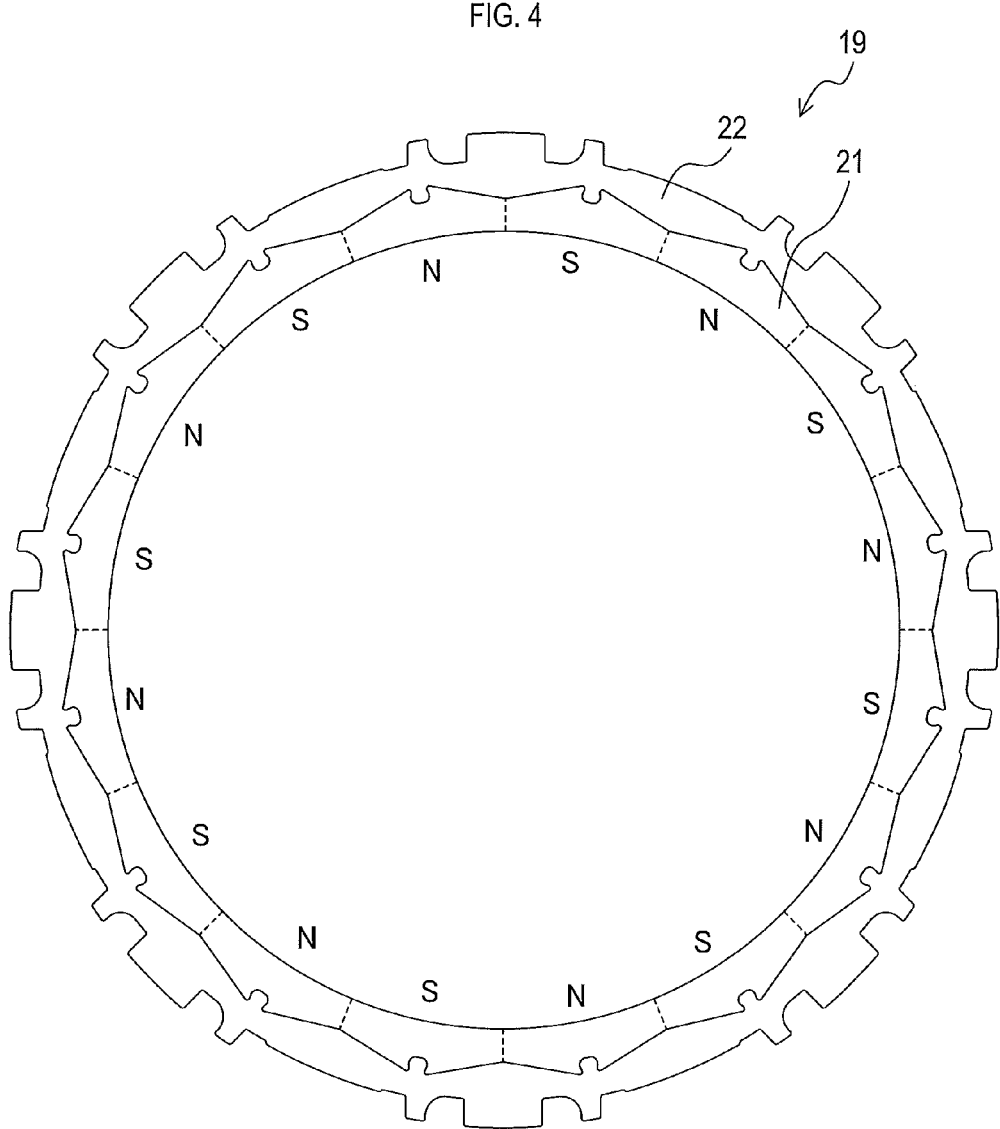
FIG. 4 is a plan view showing a rotor of a brushless motor.

As shown in FIG. 4, the rotor 19 comprises a magnet 21 having a cylindrical inner circumference, and a rotor core 22 integrally attached to the outer circumference of the magnet 21. The magnet 21 comprises, for example, a rare earth anisotropic bonded magnet. The rotor core 22 comprises, for example, a plurality of electromagnetic steel sheets stacked on top of another. The inner circumference of the magnet 21 is magnetized such that the North pole and the South pole alternately appear in the circumferential direction. In this embodiment, the rotor 19 comprises 16 magnetic poles (in other words, eight pairs of magnetic poles).

As shown in FIG. 3, the sensor board 17 is provided with three Hall sensors 23*u*, 23*v*, 23*w* as rotational position sensors that detect a rotor position from the variation in the magnetic field associated with the rotation of the rotor 19. The rotor position means the rotational position (i.e., angular position) of the rotor 19. Each of the Hall sensors 23*u*, 23*v*, 23*w* is a rotational position sensor comprising a Hall element as a magnetoelectric transducer. The Hall sensor 23*u*, the Hall sensor 23*v*, and the Hall sensor 23*w* respectively correspond to a Phase U, a Phase V, and a Phase W.

The sensor board 17 is secured to the housing body 14 with screws 24 such that the Hall sensors 23*u*, 23*v*, 23*w* are positioned to face the top end surface of the magnet 21 of the rotor 19 (that is, the end surface in the side of the top surface cover 15). The Hall sensors 23*u*, 23*v*, 23*w* are disposed in the circumferential direction of the rotor 19 having intervals of 15° in the mechanical angle therebetween (in other words, intervals of 120° in the electrical angle). In the present embodiment, the electrical angle is eight times the mechanical angle.

As shown in FIG. 2, the front end unit 6 comprises a cord holder 26, detachably attached under the motor housing 13, and a safety cover 27. The cord holder 26 is coupled to the motor shaft 20, which enables the cord holder 26 to be rotationally driven by the motor 16. The cord holder 26 holds a string shaped cutting cord 28. The leading end of the cutting cord 28 is drawn from the cord holder 26, and rotates with the cord holder 26. The trimmer 2 cuts plants with the cutting cord 28 that spins at high speed. The cutting cord 28 may be, for example, a nylon cord.

The safety cover 27 is attached to the supporting pipe 4 behind the motor housing 13 and the cord holder 26. As shown in FIG. 1, the loop handle 10 has a loop-like shape expanding upward and sideward of the supporting pipe 4. The loop handle 10 is secured to the supporting pipe 4.

The grip 12 is formed to surround the outer periphery of the supporting pipe 4. The grip 12 comprises a trigger switch 29, disposed on the lower surface of the grip 12, and a lock-off lever 30 disposed on the upper surface of the grip 12.

The trigger switch 29 is a switch to drive the motor 16 and turned on by a press-in operation. The lock-off lever 30 is a lever to restrict the press-in operation of the trigger switch 29 and to release the restriction. While the lock-off lever 30 is not being pressed in, the press-in operation of the trigger switch 29 is restricted. On the other hand, while the lock-off lever 30 is pressed in, the restriction of the press-in operation of the trigger switch 29 is released.

In front of the lock-off lever 30 on the upper surface of the grip 12, an operation unit 31 and a display panel 32 are disposed. The operation unit 31 is provided with an operation button to change, for example, the rotational direction and rotational speed of the motor 16. The display panel 32 is provided with a light emitting diode (LED) 34 (see FIG. 5) that indicates, for example, the presence/absence of malfunction and the operational state of the motor 16.

A user of the trimmer 2 (that is, an operator) holds the loop handle 10 in one hand and holds the grip 12 in the other hand. Then, the user presses in the lock-off lever 30 with the base of the thumb of the hand holding the grip 12, and presses in the trigger switch 29 with another finger of the same hand. Electric power is thereby supplied to the motor 16. Moreover, the user operates the operation button of the operation unit 31 with his/her thumb of the hand holding the grip 12, which enables the user to adjust, for example, the rotational direction and the rotational speed of the motor 16.

As shown in FIG. 1, the rear end unit 8 comprises a rear end housing 36, housing a control device 35 that controls the motor 16 (see FIG. 5), and battery packs 37*a*, 37*b* detachably attached to the rear end housing 36.

The battery packs 37*a*, 37*b* are attached to the rear end housing 36 and thereby electrically coupled to each other in series (see FIG. 5). In other embodiments, the rear end housing 36 may be configured such that a single battery pack can be attached thereto, or such that three or more battery packs can be attached thereto. The battery 38*a* accommodated in the battery pack 37*a* (see FIG. 5) and the battery 38*b* accommodated in the battery pack 37*b* (see FIG. 5) are repeatedly chargeable batteries, such as lithium ion batteries, and individually have 18 volt of nominal voltage, for example.

[Drive Control System of Motor]

As shown in FIG. 5, the motor 16 comprises the above-described coils 41*u*, 41*v*, 41*w*, a Phase U terminal 43*u*, a Phase V terminal 43*v*, and a Phase W terminal 43*w*. In this embodiment, the coils 41*u*, 41*v*, 41*w* are coupled in star configuration (or Y configuration). The Phase U terminal 43*u* is coupled with an end of the Phase U coil 41*u*, the Phase V terminal 43*v* is coupled with an end of the Phase V coil 41*v*, and the Phase W terminal 43*w* is coupled with an end of the Phase W coil 41*w*.

To the control device 35 that controls the motor 16, the terminals 43*u*, 43*v*, 43*w* of the motor 16, the Hall sensors 23*u*, 23*v*, 23*w*, the trigger switch 29, and the LED 34 are coupled.

Moreover, to the control device 35, the serially coupled battery packs 37*a*, 37*b* are coupled and electric power is supplied therefrom. Specifically, the battery 38*a* inside the battery pack 37*a* and the battery 38*b* inside the battery pack 37*b* are serially coupled to supply electric power, having the sum of the output voltage of the battery 38*a* and the output voltage of the battery 38*b*, to the control device 35. Hereinafter, the battery 38*a* and the battery 38*b* are generically referred to as a battery 38. The control device 35 is operated by the electric power from the battery 38. The electric power is also supplied to the motor 16 for driving the motor 16.

Each of the Hall sensors 23*u*, 23*v*, 23*w* outputs a position detection signal (hereinafter referred to as Hall signal) that indicates the corresponding rotational position of the rotor 19. Specifically, the logic level of the Hall signal is shifted to high or low corresponding to the variation in the magnetic field generated by the rotating rotor 19. Hereinafter, the Hall signal outputted from the Hall sensor 23*u* is referred to as a Hall signal HaU, the Hall signal outputted from the Hall sensor 23*v* is referred to as a Hall signal HaV, and the Hall signal outputted from the Hall sensor 23*w* is referred to as a Hall signal HaW.

Figure 6:
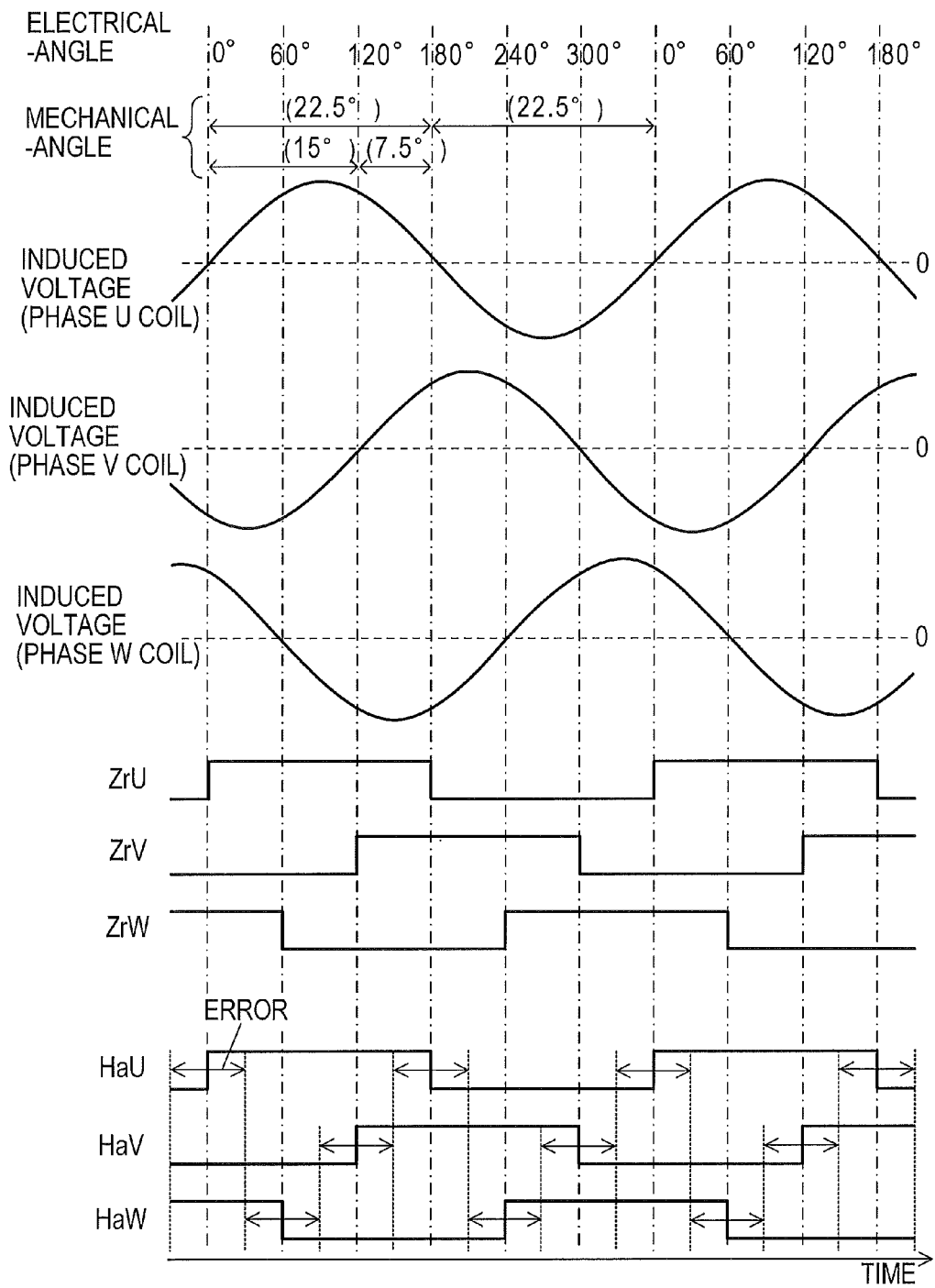
FIG. 6 is a time chart showing induced voltages, zero-cross signals, and Hall signals of respective phases.

In the present embodiment, as described above, the rotor 19 comprises 16 magnetic poles. Accordingly, the logic level of each of the Hall signals HaU, HaV, HaW outputted from the Hall sensors 23*u*, 23*v*, 23*w* is shifted into high or low every time the rotor 19 is rotated by 22.5° (that is, every 22.5° in the mechanical angle) as shown in the lower portion of FIG. 6. Then, the phases of the Hall signals HaU, HaV, HaW are shifted from one another by 15° in the mechanical angle. Thus, a change in any of the logic levels (that is, edge) of the Hall signals HaU, HaV, HaW is caused every time the rotor 19 is rotated by 7.5° (that is, every 7.5° in the mechanical angle). The angles shown in the brackets in FIG. 6 are mechanical angles.

In the electrical angle, the logic level of each of the Hall signals HaU, HaV, HaW is shifted into high or low at every 180° in the electrical angle. Since the phases of the Hall signals HaU, HaV, HaW are shifted by 120° in the electrical angle from one another, a change in the logic level of any of the Hall signals HaU, HaV, HaW is caused at every 60° in the electrical angle.

The timing for a change in the logic level (hereinafter referred to as level change timing) of the Hall signal HaU with Phase U (hereinafter also referred to as Phase U Hall signal) outputted from the Hall sensor 23u is when the Hall sensor 23u detects a rotor position every 180° in the electric angle, which corresponds to the detection result of the rotor position detected by the Hall sensor 23u. Similarly, the level change timing of the Hall signal HaV with Phase V (hereinafter also referred to as Phase V Hall signal) outputted from the Hall sensor 23v is when the Hall sensor 23v detects another rotor position every 180° in the electrical angle, which corresponds to the detection result of the rotor position detected by the Hall sensor 23v. Likewise, the level change timing of the Hall signal HaW with Phase W (hereinafter also referred to as Phase W Hall signal) outputted from the Hall sensor 23w, is when the Hall sensor 23w detects still another rotor position every 180° in the electrical angle, which corresponds to the detection result of the rotor position detected by the Hall sensor 23w.

As shown in FIG. 5, the control device 35 comprises a regulator 45, a microcomputer 46, a memory 47, a driver circuit 48, an electric current detection circuit 49, and a rotor position detection circuit 50.

The regulator 45 generates and outputs power supply voltage Vcc (for example, 5 V) from the voltage of the battery 38 (hereinafter referred to as battery voltage) to operate the microcomputer 46 and other components.

The microcomputer 46 comprises a CPU, a RAM, a ROM, and an A/D converter. The microcomputer 46 mainly executes processes for controlling the motor 16. The operation of the microcomputer 46 is achieved by the CPU executing a program stored in recording medium. In this embodiment, the ROM corresponds to the recording medium storing the program. By running this program, a method corresponding to the program is performed. In other embodiments, the control device 35 may comprise a plurality of microcomputers 46. In other embodiments, the process performed by the microcomputer 46 may be partially or completely performed by a hardware made by a combination of, for example, a logic circuit and an analog circuit. More specifically, in the control device 35, the partial or the entire function of the microcomputer 46 may be achieved: by a combination of various individual electronic components; by an ASIC (Application Specified Integrated Circuit); by a programmable logic device, such as an FPGA (Field Programmable Gate Array); or by a combination of these components.

The memory 47 is a rewritable non-volatile memory such as a flash ROM and an EEPROM. The memory 47 is configured to be accessable by the microcomputer 46. In other embodiments, the memory 47 may be installed inside of the microcomputer 46.

The driver circuit 48 is a circuit for rotationally driving the motor 16 by, for example, switching the conduction state of the coils 41u, 41v, 41w of the motor 16, or controlling electric current that runs to the coils 41u, 41v, 41w. For this purpose, the driver circuit 48 is coupled to the terminals 43u, 43v, 43w of the motor 16.

The driver circuit 48 is an inverter circuit comprising six switching elements (not shown). These six switching elements comprise three switching elements as high-side switches and three switching elements as low-side switches. The three switching elements as the high-side switches change connection and disconnection of the positive electrode line of the battery 38 with the terminals 43u, 43v, 43w. The three switching elements as the low-side switches change connection and disconnection of ground line of the battery 38 with the terminals 43u, 43v, 43w. The positive electrode line is a line to which the positive electrode terminal of the battery 38 is coupled. The ground line is a line to which the negative electrode terminal of the battery 38 is coupled. In this embodiment, the positive electrode terminal of the battery 38 is the positive electrode terminal of the battery pack 37a in the upstream side. The negative electrode terminal of the battery 38 is the negative electrode terminal of the battery pack 37b in the downstream side.

The driver circuit 48 switches on or off each of the aforementioned six switching elements according to drive command signals UH, VH, WH, UL, VL, WL from the microcomputer 46, and energizes each of the coils 41u, 41v, 41w.

The electric current detection circuit 49 outputs a current detection signal, indicating the magnitude of electric current flowing into the negative electrode terminal of the battery 38, to the microcomputer 46. In the motor 16, when the rotor 19 is rotated, an induced voltage in a sine-wave manner as shown in the upper part of FIG. 6 is generated in each of the coils 41u, 41v, 41w. Then, a corresponding induced voltage is generated at each of the terminals 43u, 43v, 43w of the motor 16.

The rotor position detection circuit 50 detects voltage of each of the terminals 43u, 43v, 43w as the induced voltage of each of the coils 41u, 41v, 41w. The rotor position detection circuit 50 outputs zero-cross signals ZrU, ZrV, ZrW. As shown in the upper part of FIG. 6, the zero-cross signal ZrU is a zero-cross signal corresponding to Phase U and having a shaped waveform in which the logic level thereof is shifted to high or low depending on whether the induced voltage of the Phase U coil 41u is larger than a reference voltage. The zero-cross signal ZrV is a zero-cross signal corresponding to Phase V and having a shaped waveform in which the logic level thereof is shifted to high or low depending on whether the induced voltage of the Phase V coil 41v is larger than the reference voltage. The zero-cross signal ZrW is a zero-cross signal corresponding to Phase W and having a shaped waveform in which the logic level thereof is shifted to high or low depending on whether the induced voltage of the Phase W coil 41w is larger than the reference voltage. The reference voltage is a neutral point voltage among the coils 41u, 41v, 41w and is a center voltage of the induced voltages having fluctuating waveforms. In the embodiment shown in FIG. 6, the reference voltage is 0 V.

For example, in the rotor position detection circuit 50, a voltage obtained by adding the voltages of the terminals 43u, 43v, 43w in an adder circuit, is the neutral point voltage. The voltages of the terminals 43u, 43v, 43w are each compared to the neutral point voltage in a comparator circuit, and then the zero-cross signals ZrU, ZrV, ZrW are outputted.

In other words, the rotor position detection circuit 50 detects the respective differences between the respective voltages of the terminals 43u, 43v, 43w and the neutral point voltage as the respective induced voltages generated in the coils 41u, 41v, 41w. The rotor position detection circuit 50 further outputs high or low signals, each indicating plus/minus of the respective induced voltages, as the respective zero-cross signals ZrU, ZrV, ZrW.

If the Hall sensors 23u, 23v, 23w do not have detection errors, the level change timings of the zero-cross signals ZrU, ZrV, ZrW respectively match with the level change timings of Hall signals HaU, HaV, HaW when the motor 16 is inertially rotated. In other words, as shown in the lower part of FIG. 6, the phase of the Phase U zero-cross signal ZrU matches with the phase of the Phase U Hall signal HaU, the phase of the Phase V zero-cross signal ZrV matches with the phase of the Phase V Hall signal HaV, and the phase of the Phase W zero-cross signal ZrW matches with the phase of the Phase W Hall signal HaW. A case "when the motor 16 is inertially rotated" means that when all the switching elements in the driver circuit 48 are in an off-state (that is, in a non-conduction state) in which electric conduction is not provided to the coils 41u, 41v, 41w, and thus the rotor 19 is rotated by inertia.

The level change timing of any of the zero-cross signals ZrU, ZrV, ZrW corresponds to the timing when the rotor position detection circuit 50 detects the rotor position every 60° in the electrical angle (in other words, every 7.5° in the mechanical angle), and corresponds to the detection result of the rotor position obtained by the rotor position detection circuit 50.

Each of the Hall sensors 23u, 23v, 23w actually has an assembly error, due to which a detection error in the rotor position is caused. Consequently, as shown with bidirectional arrows in the lower part of FIG. 6, the level change timings of the Hall signals HaU, HaV, HaW are shifted forward or backward with respect to the correct timings by the detection errors. When the motor 16 is inertially rotated, the level change timing of any of the zero-cross signals ZrU, ZrV, ZrW comes every 60° in the electrical angle.

As shown in FIG. 5, into the microcomputer 46, the Hall signals HaU, HaV, HaW, the zero-cross signals ZrU, ZrV, ZrW, a current detection signal from the electric current detection circuit 49, and a signal from the trigger switch 29 are inputted. The signal from the trigger switch 29 indicates the on state or the off state of the trigger switch 29.

When the microcomputer 46 controls the motor 16 (in other words, drives the motor 16), based on the Hall signals HaU, HaV, HaW, the microcomputer 46 detects the rotor position in every 60° in the electrical angle. Then, at the detection timings, the drive command signals UH, VH, WH, UL, VL, WL to the driver circuit 48 are switched in a specified sequence to switch the excitation in each of the coils 41u, 41v, 41w. In other words, the microcomputer 46 switches the coils to be energized among the coils 41u, 41v, 41w and the direction of conduction current in accordance with a specified excitation sequence. The microcomputer 46 operates the motor 16 by such excitation switching. Moreover, the microcomputer 46 controls the drive command signals, among the drive command signals UH, VH, WH, UL, VL, WL, to switch on or off the high-side switches or the low-side switches in the driver circuit 48 according to PWM (pulse width modulation) control so as to control the rotational speed of the motor 16. The microcomputer 46 also controls the driving of the LED 34 disposed in the display panel 32.

As described above, since the Hall sensors 23u, 23v, 23w have assembly errors, the level change timings of the Hall signals HaU, HaV, HaW may be shifted from the correct timing that comes every 60° in the electrical angle.

Consequently, the microcomputer 46 compares, when the motor 16 is inertially rotated, the Hall signals HaU, HaV, HaW with corresponding zero-cross signals ZrU, ZrV, ZrW to calculate correction values. The correction values are meant for correcting the level change timings of the Hall signals HaU, HaV, HaW, in other words, meant for correcting the detection results of the rotor position obtained by the Hall sensors 23u, 23v, 23w. When the microcomputer 46 controls the motor 16, the microcomputer 46 corrects the actual level change timings of the Hall signals HaU, HaV, HaW with the correction values, and, based on the corrected timings, switches the excitation of each of the coils 41u, 41v, 41w.

[Outline of Correction Process]

The process to correct the level change timing is performed for each of the Hall signals HaU, HaV, HaW. Hereinafter, any of Phase U, Phase V, Phase W is represented as a "Phase X". The following describes the outline of the correction process for a Phase X Hall signal. In other words, "X" included in reference numerals means to correspond to Phase X, and Phase X means one of Phase U, Phase V, and Phase W. For example, the reference numeral for the Phase X Hall signal is "HaX", while the reference numeral for the Phase X zero-cross signal is "ZrX".

The microcomputer 46 executes processes <1> to <3> to be described below.

<1> When the motor 16 is inertially rotated, a time difference TeX between the level change timing of a Hall signal HaX and the level change timing of a zero-cross signal ZrX and half-cycle time TcX are detected. The half-cycle time TcX is a time interval in which the logic level of the Hall signal HaX changes.

If the level change timing of the Hall signal HaX comes prior to the level change timing of the zero-cross signal ZrX, that is, if the Hall signal HaX is shifted with respect to the zero-cross signal ZrX toward the advance-angle side, the plus or minus sign of the time difference TeX is determined to be plus.

On the other hand, if the level change timing of the Hall signal HaX comes later than the level change timing of the zero-cross signal ZrX, that is, if the Hall signal HaX is shifted with respect to the zero-cross signal ZrX toward the delay angle side, the plus or minus sign of the time difference TeX is determined to be minus. However, the plus or minus signs may be used reversely from the aforementioned manner.

<2> If the plus or minus sign of the detected time difference TeX is plus, that is, the Hall signal HaX is shifted toward the advance angle side, a correction value RX is calculated by the following Expression 1 with the time difference TeX and the half-cycle time TcX to correct the level change timing of the Hall signal HaX. The calculated correction value RX is stored in the memory 47.

Correction Value $RX$=Time Difference $TeX$/Half-Cycle Time $TcX$      Expression 1

If the plus or minus sign of the detected time difference TeX is minus, that is, the Hall signal HaX is shifted toward the delay angle side, the correction value RX is calculated by the following Expression 2, with the time difference TeX and the half-cycle time TcX. The calculated correction value RX is stored in the memory 47.

Correction Value $RX$=1−Time Difference $TeX$/Half-Cycle Time $TcX$      Expression 2

<3> To control the motor 16, the half-cycle time TcX of the Hall signal HaX is also detected. Furthermore, to control the motor 16, the timing when a correction time TrX represented by the following Expression 3 passes from the level change timing of the Hall signal HaX is set as the level change timing after correction (that is, correct level change timing). Then, the excitation switching is carried out at the level change timing after correction.

$$\text{Correction Time } TrX = \text{Correction Value } RX \times \text{Half-Cycle Time } TcX \quad \text{Expression 3}$$

Figure 7:
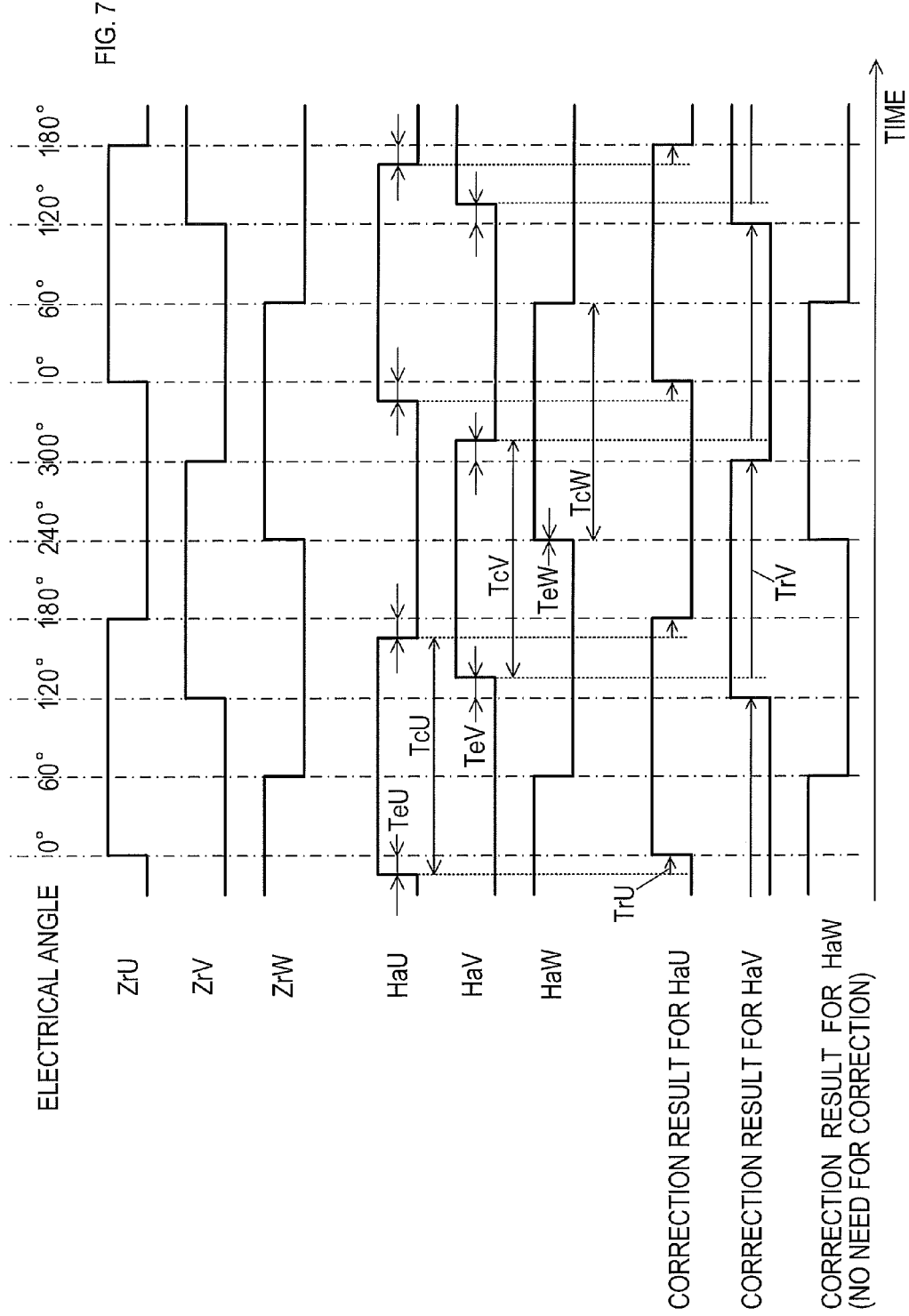
FIG. 7 is a time chart showing the detail of a correction process and an example thereof.

A specific example will be described with reference to FIG. 7. In FIG. 7, each of the time differences TeU, TeV, TeW, is the time difference detected in the above-described process <1> with respect to a corresponding Hall signal among the Hall signals HaU, HaV, HaW. Each of the half-cycle times TcU, TcV, TcW is the half-cycle time detected in the above-described process <1> with respect to a corresponding Hall signal among the Hall signals HaU, HaV, HaW. Each of the correction times TrU, TrV is the correction time calculated by Expression 3 with respect to a corresponding Hall signal among the Hall signals HaU, HaV. In the example of FIG. 7, since no phase difference exists between the Hall signal HaW and the zero-cross signal ZrW, the time difference TeW is zero and, thus, the Hall signal HaW is not corrected.

In the example of FIG. 7, since the Hall signal HaU is shifted toward the advance angle side with respect to the zero-cross signal ZrU, the plus or minus sign of the time difference TeU calculated by the above-described process <1> becomes plus. Then, the correction value RU for the Hall signal HaU is calculated by Expression 1. The correction value RU is the ratio of the time difference TeU with respect to the half-cycle time TcU of the Hall signal HaU.

Consequently, during controlling the motor 16, the correction time TrU obtained by multiplying the half-cycle time TcU of the Hall signal HaU by the correction value RU is the time in which the Hall signal HaU is shifted toward the advance angle side with respect to the zero-cross signal ZrU.

Consequently, when the microcomputer 46 controls the motor 16, as shown from Row 4 to Row 7 from the top of FIG. 7, the timing delayed by the correction time TrU from the current level change timing of the Hall signal HaU is set as a current correct level change timing.

In the example of FIG. 7, since the Hall signal HaV is shifted toward the delay angle side with respect to the zero-cross signal ZrV, the plus or minus sign of the time difference TeV calculated in the above-described process <1> becomes minus. Then, the correction value RV for the Hall signal HaV is calculated by Expression 2. The correction value RV is a value obtained by subtracting the ratio of the time difference TeV with respect to the half-cycle time TcV of the Hall signal HaV from 1. In other words, the correction value RV is the ratio of the time, obtained by subtracting the time difference TeV from the half-cycle time TcV, with respect to the half-cycle time TcV.

Consequently, when the motor 16 is controlled, the correction time TrV, obtained by multiplying the half-cycle time TcV of the Hall signal HaV by the correction value RV, is the time obtained by subtracting the time in which the Hall signal HaV is shifted toward the delay angle side with respect to the zero-cross signal ZrV from the half-cycle time TcV.

Consequently, when the microcomputer 46 controls the motor 16, as shown from Row 5 to Row 8 from the top of FIG. 7, the microcomputer 46 sets the timing delayed by the correction time TrV from the current level change timing of the Hall signal HaV as the next correct level change timing.

[Process Details]

Figure 8:
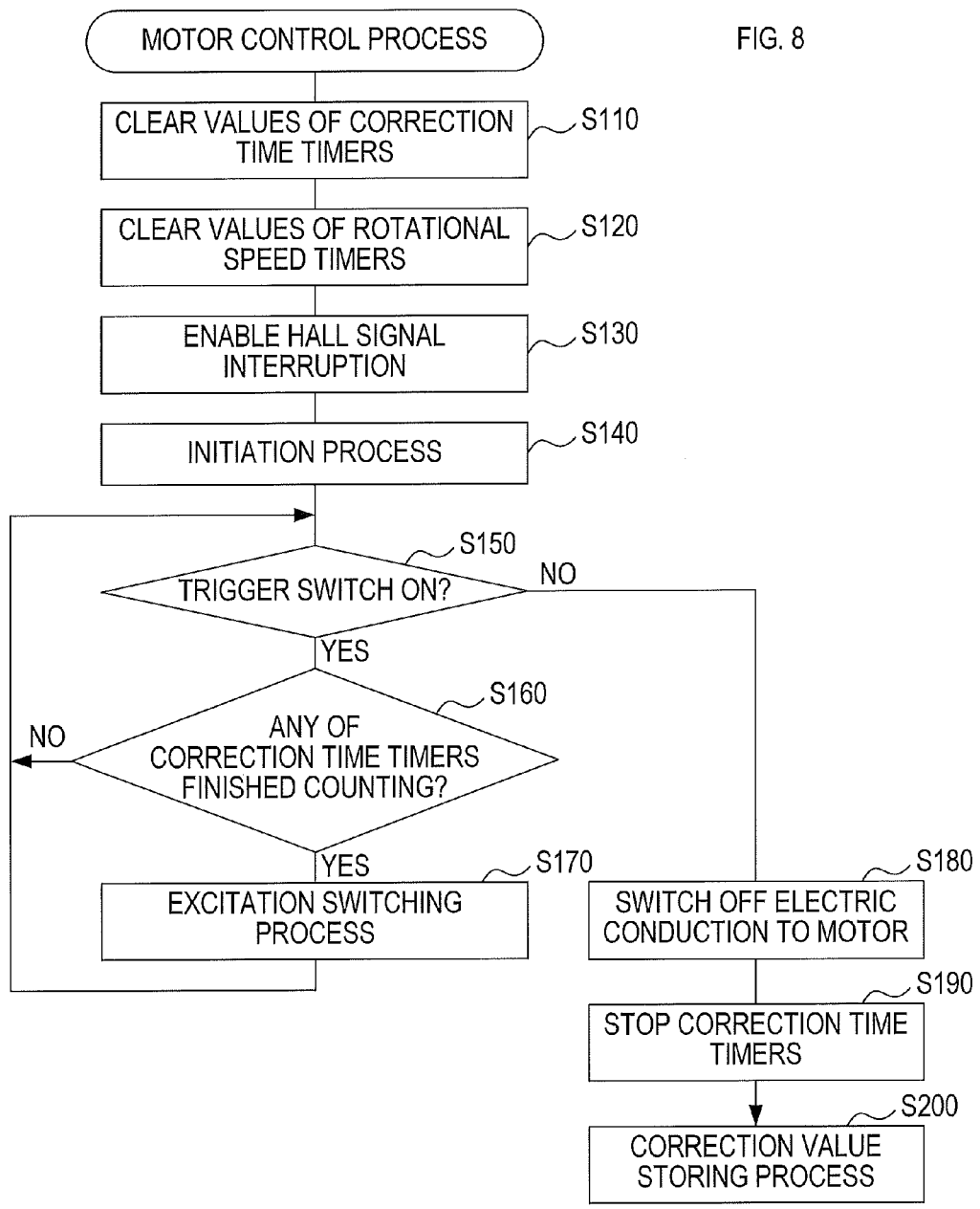
FIG. 8 is a flowchart illustrating a motor control process.

The microcomputer 46 detects, based on the signal from the trigger switch 29, that the trigger switch 29 has been switched on, and executes the motor control process shown in FIG. 8.

As shown in FIG. 8, upon initiating the motor control process, the microcomputer 46 clears correction time timer values for Phase U, Phase V, and Phase W in S110.

The correction time timer values are values of correction time timers. The correction time timers are individually provided for each of Phase U, Phase V, and Phase W. The correction time timer for Phase U measures the above-described correction time TrU for the Phase U Hall signal HaU to determine that the correction time TrU has passed. The correction time timer for Phase V measures the correction time TrV for the Phase V Hall signal HaV to determine that the correction time TrV has passed. The correction time timer for Phase W measures the correction time TrW for the Phase W Hall signal HaW to determine that the correction time TrW has passed.

For example, each of the correction time timers comprises a counter that increments a counter value by one at every specified unit time that is sufficiently short, and a setting unit in which a count target value, obtained by dividing the correction time of a measurement target by the aforementioned unit time, is set. A count ending flag is set when the value of the counter becomes equal to the value set in the setting unit after count-up of the above-described counter is started. In such correction time timer, the value of the above-described counter corresponds to the correction time timer value, setting the aforementioned count target value in the aforementioned setting unit corresponds to setting the correction time of a measurement target in the correction time timer. Setting the value of the above-described counter zero and starting a count-up of the counter corresponds to starting the correction time timer. The value of the above-described counter being equal to the value set in the setting unit and the count ending flag being set corresponds to ending the counting by the correction time timer.

Subsequently in S120, the microcomputer 46 clears rotational speed timer values for Phase U Phase V, and Phase W. The rotational speed timer values are values of the rotational speed timers, which are individually provided for each of Phase U, Phase V, and Phase W. The rotational speed timer for Phase U measures the half-cycle time TcU of the Phase U Hall signal HaU. The rotational speed timer for Phase V measures the half-cycle time TcV of the Phase V Hall signal HaV. The rotational speed timer for Phase W measures the half-cycle time TcW of the Phase W Hall signal HaW. For example, each of the rotational speed timers includes a counter in which the counter value is incremented by one at the aforementioned unit time. The counter value corresponds to the rotational speed timer value.

Subsequently in S130, the microcomputer 46 enables the Hall signal interruption. In the microcomputer 46, when the Hall signal interruption is enabled in S130, the first interruption process for the Phase U Hall signal and the second interruption process for the Phase U Hall signal are executed every time when the logic level changes in the Phase U Hall signal HaU. Similarly, every time when the logic level changes in the Phase V Hall signal HaV, the first interruption process for the Phase V Hall signal and the second interruption process for the Phase V Hall signal are executed, and every time when the logic level changes in the Phase W Hall signal HaW, the first interruption process for the Phase W Hall signal and the second interruption process for the Phase W Hall signal are executed. These interruption processes for the Hall signals will be described later.

The microcomputer 46 executes an initiation process to start the motor 16 in S140, (that is, the rotor 19 in the stopped state is brought into rotation). This initiation process is to start the motor 16 by, for example, switching the electric conduction to each of the coils 41u, 41v, 41w in a specified pattern irrespective of the rotor position.

Subsequently in S150, the microcomputer 46 determines whether the trigger switch 29 is on. If it is determined that the trigger switch 29 is on, the process proceeds to S160.

In S160, the microcomputer 46 determines whether any of the correction time timers has finished counting. The correction time timer finishing counting means that the correction time set for a measurement target in that correction time timer has passed. If the microcomputer 46 makes a negative determination in S160, that is, none of the correction time timers has finished counting, the process goes back to S150.

On the other hand, if the microcomputer 46 makes an affirmative determination in S160, that is, one of the correction time timers has finished counting, the microcomputer 46 clears the above-described count ending flag that corresponds to the correction time timer that has finished counting. Then, the process proceeds to S170 in which the microcomputer 46 executes the excitation switching process, and then the process goes back to S150.

The following describes the process in which, every time when the logic level of any of the Hall signals HaU, HaV, HaW changes, the correction time is set in a corresponding correction time timer, and the correction time timer is started, with a reference to an example of Phase U.

The microcomputer 46 executes the first interruption process for the Phase U Hall signal, shown in FIG. 9, every time when the logic level of the Phase U Hall signal HaU changes.

As shown in FIG. 9, upon initiating the first interruption process for the Phase U Hall signal, in S210, the microcomputer 46 determines whether the rotational speed timer for Phase U has started. If it is determined that the rotational speed timer for Phase U has not yet started, the process proceeds to S230, to clear the value of the rotational speed timer for Phase U to zero, and then to start the rotational speed timer for Phase U. Accordingly, the value of the rotational speed timer for Phase U increments by one every time the above-described unit time passes.

On the other hand, if the microcomputer 46 determines that the rotational speed timer for Phase U has started in S210, that is, if the rotational speed timer for Phase U has been cleared and started previously in S230, the process proceeds to S220.

In S220, the microcomputer 46 updates the value of the rotational speed timer for Phase U and stores the updated value in the RAM (in other words, overwrites the updated value). Subsequently, the process proceeds to S230 in which the rotational speed timer for Phase U is cleared and started again (in other words, restarted). Accordingly, the value of the rotational speed timer for Phase U stored in the RAM in S220 is a value obtained by measuring the half-cycle time TcU of the Phase U Hall signal HaU in which the aforementioned unit time is used as the resolution. Since the half-cycle time TcU is inversely proportional to the rotational speed of the motor 16 (hereinafter referred to as motor rotational speed, or simply rotational speed), in this sense, thus it can be said that the rotational speed is detected in S220.

Subsequently to execution of the process of S230, the process proceeds to S240 in which the microcomputer 46 calculates the correction time TrU for Phase U with the following Expression 4.

Correction Time $TrU$=Correction Value $RU$×Value of Rotational Speed Timer for Phase $U$    Expression 4

The correction time TrU is the correction time for the Phase U Hall signal HaU. The correction value RU is the correction value for the Phase U Hall signal HaU. For the "correction value RU" in Expression 4, a value stored in the memory 47 by a correction value storing process is used. The correction value storing process is shown in FIGS. 10A and 10B and to be described later. For the "value of the rotational speed timer for Phase U" in Expression 4, "the value of the rotational speed timer for Phase U" stored in the currently performed S220 is used. In other words, in Expression 4, "the value of the rotational speed timer for Phase U" stored in S220 is used as the "half-cycle time TcX" that is used in the above-described Expression 3. If no correction value RU has been stored in the memory 47, or if the value of the rotational speed timer for Phase U has not been stored by the process of S220, the correction time TrU is calculated as a default value, zero.

Subsequently in S250, the microcomputer 46 sets the correction time TrU calculated in S240 in the correction time timer for Phase U and start the correction time timer. When the set correction time TrU passes, the correction time timer for Phase U finishes the counting. When the microcomputer 46 finishes the process of S250, the first interruption process for the Phase U Hall signal is completed.

The microcomputer 46 executes the same processes as the first interruption process for the Phase U Hall signal for each of Phase V Hall signal HaV and the Phase W Hall signal HaW every time when the logic levels of these signals change. The first interruption process for the Phase V Hall signal, performed every time when the logic level of the Phase V Hall signal HaV changes, is the process performed for "Phase V" instead of "Phase U" shown in FIG. 9. Similarly, the first interruption process for the Phase W Hall signal, performed every time when the logic level of the Phase W Hall signal HaW changes, is the process performed for "Phase W" instead of "Phase U" shown in FIG. 9. It should be noted that the same step numbers as in FIG. 9 are used for the first interruption process for the Phase V Hall signal and the first interruption process for the Phase W Hall signal, and that the first interruption process for the Phase U Hall signal, the first interruption process for the Phase V Hall signal, and the first interruption process for the Phase W Hall signal are collectively referred to as the first interruption process for the respective phases Hall signal.

Accordingly, the timing when the microcomputer 46 makes an affirmative determination in S160 of FIG. 8 is when, from the level change timing for any of the Hall signals HaU, HaV, HaW, the correction time for that particular Hall signal passes. At that timing, the microcomputer 46 executes the excitation switching.

Going back to the description of the procedure in FIG. 8, in S150, if the microcomputer 46 determines that the trigger switch 29 is off, that is, when the trigger switch 29 has been switched off by the user, the process proceeds to S180 in which electric conduction to the motor 16 is switched off. In other words, electric conduction to the coils 41u, 41v, 41w is stopped. Accordingly, the motor 16 is temporarily rotated by inertia. The microcomputer 46 stops each of the correction time timers in S190, and executes the correction value storing process, shown in FIGS. 10A and 10B, in S200. Consequently, the correction value storing process is executed when the motor 16 is inertially rotated.

As shown in FIGS. 10A and 10B, when the correction value storing process is initiated, the microcomputer 46 clears error timer values for Phase U, Phase V, and Phase W in S310.

The error timer values are values in error timers. The respective error timers are provided for Phase U, Phase V, and Phase W. The error timer for Phase U measures the time difference TeU between the level change timing of the Phase U Hall signal HaU and the level change timing of the Phase U zero-cross signal ZrU as the detection error of the rotor position obtained by the Hall sensor 23u for Phase U. Similarly, the error timer for Phase V measures the time difference TeV between the level change timing of the Phase V Hall signal HaV and the level change timing of the Phase V zero-cross signal ZrV as the detection error of the rotor position obtained by the Hall sensor 23v for Phase V. Similarly, the error timer for Phase W measures the time difference TeW between the level change timing of the Phase W Hall signal HaW and the level change timing of the Phase W zero-cross signal ZrW as the detection error of the rotor position obtained by the Hall sensor 23w for Phase W. For example, each of the error timers includes a counter in which the counter value is incremented by one at the aforementioned unit time. The counter value corresponds to the error timer value.

Subsequently in S320, the microcomputer 46 determines whether the trigger switch 29 is off. If it is determined that the trigger switch 29 is off, the process proceeds to S330.

In S330, the microcomputer 46 determines whether the motor rotational speed is equal to a specified maximum speed SH or lower. If it is determined that the motor rotational speed is not equal to the maximum speed SH or lower (that is, higher than the maximum speed SH), the process goes back to S320. The motor rotational speed for the determination target is calculated from a value obtained by, for example, averaging the values of the rotational speed timers for all phases that are updated and stored by the first interruption process for the Phase U Hall signal, the first interruption process for the Phase V Hall signal, and the first interruption process for the Phase W Hall signal.

On the other hand, if the microcomputer 46 determines that the motor rotational speed is equal to the maximum speed SH or lower in S330, the process proceeds to S340, and the microcomputer 46 enables the zero-cross signal interruption.

Figure 11:
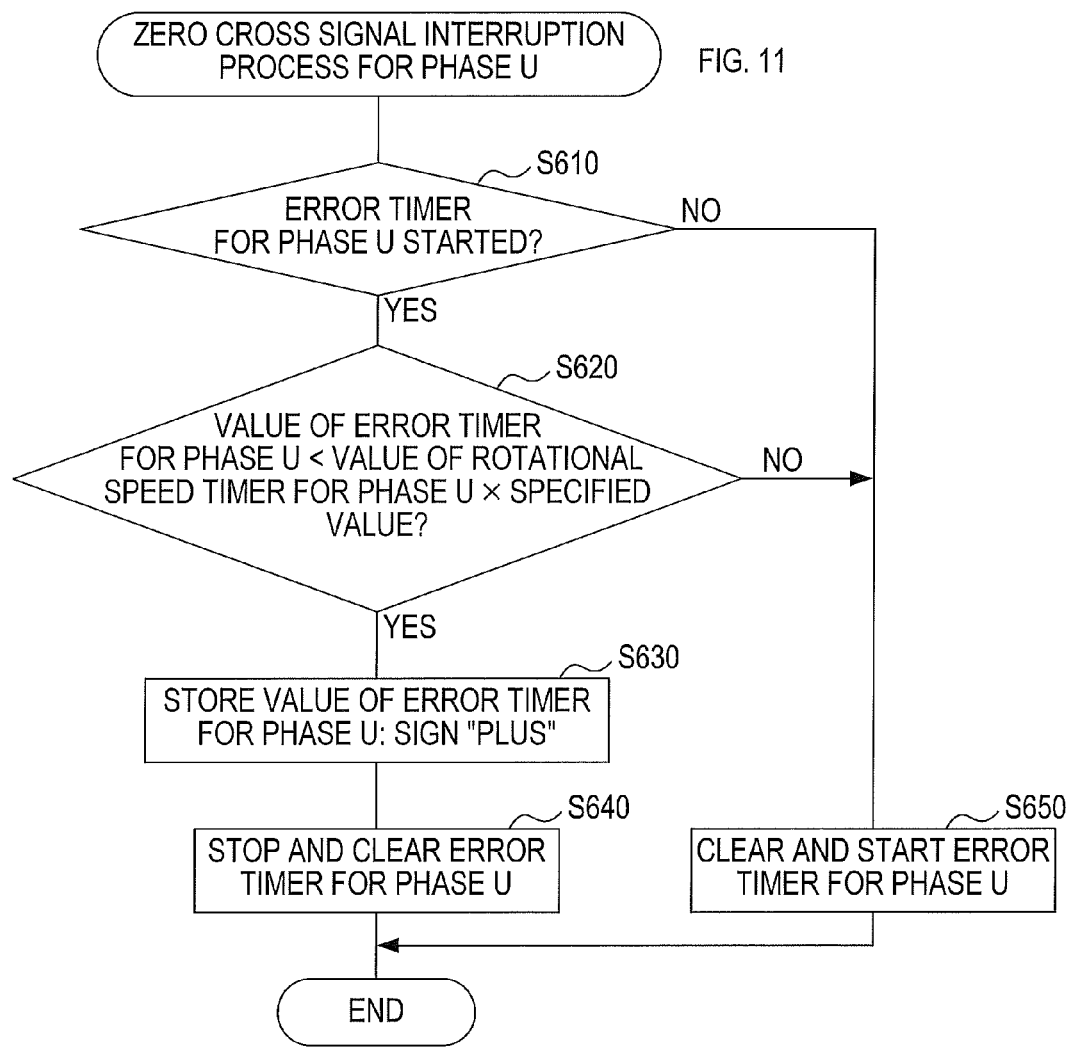
FIG. 11 is a flowchart illustrating an interruption process for Phase U zero-cross signal.

While in the state in which the zero-cross signal interruption is enabled, the microcomputer 46 executes the interruption process for the Phase U zero-cross signal shown in FIG. 11 every time when the logic level in the Phase U zero-cross signal ZrU changes. The microcomputer 46 also executes the same process shown in FIG. 11 for the Phase V zero-cross signal ZrV and the Phase W zero-cross signal ZrW every time when the logic level in each of these zero-cross signals changes. The interruption process for the Phase V zero-cross signal, executed every time when the logic level of the Phase V zero-cross signal ZrV changes, is the process executed for "Phase V" instead of "Phase U" shown in FIG. 11. Similarly, the interruption process for the Phase W zero-cross signal, executed every time when the logic level of the Phase W zero-cross signal ZrW changes, is the process executed for the "Phase W" instead of the "Phase U" shown in FIG. 11. Accordingly, the interruption process for the Phase U zero-cross signal will now be described with reference to FIG. 11. It should be noted that the same step numbers as in FIG. 11 are used for the interruption process for the Phase V zero-cross signal and the interruption process for the Phase W zero-cross signal, and that the interruption process for the Phase U zero-cross signal, the interruption process for the Phase V zero-cross signal, and the interruption process for the Phase W zero-cross signal are collectively referred to as the interruption process for the respective phases zero-cross signal.

As shown in FIG. 11, when the interruption process for the Phase U zero-cross signal is initiated, the microcomputer 46 determines, in S610, whether the error timer for Phase U has started. It should be noted that the error timer for Phase U is cleared and started in S650 (to be described later) in the interruption process for the Phase U zero-cross signal, or in S750 in FIG. 12 (to be described later). It is also determined in S610 that the error timer for Phase U has been already started if the value of the error timer for Phase U is larger than zero.

If the microcomputer 46 determines in S610 that the error timer for Phase U has been already started, the process proceeds to S620 in which it is determined whether the value of the error timer for Phase U satisfies the relation of Expression 5 shown below.

Value of Rotational Speed Timer for Phase $U$<Value of Rotational Speed Timer for Phase $U$×Specified value  Expression 5

"The value of the rotational speed timer for Phase U" in Expression 5 is updated and stored in S220 in FIG. 9. The "specified value" in Expression 5 is a preset value which is the maximum value of the ratio of the time difference TeU to the half-cycle time TcU (=TeU/TcU). Although the specified value in the present embodiment is a common value for Phase U, Phase V, and Phase W, the specified value may be a different value for Phase U, Phase V, and Phase W.

If the microcomputer 46 determines in S620 that the value of the error timer for Phase U satisfies the relation of Expression 5, the process proceeds to S630 in which the value of the error timer for Phase U and the plus or minus sign of the value of the error timer are associated to each other and stored in the RAM. In S630, "plus" is stored for the plus or minus sign.

Subsequently in S640, the microcomputer 46 stops the error timer for Phase U, clears the value of the error timer for Phase U to zero, and then finishes the Phase U zero-cross signal interruption.

If the microcomputer 46 determines in S610 that the error timer for Phase U has not been started (that is, stopped), or determines in S620 that the value of the error timer for Phase U does not satisfy the relation of Expression 5, the process proceeds to S650. The microcomputer 46 clears and starts the error timer for Phase U in S650. Then, the interruption process for the Phase U zero-cross signal ends.

On the other hand, in S340 of FIG. 10A, if the microcomputer 46 enables the zero-cross signal interruption, the Hall signal interruption has been already enabled in S130 of FIG. 8.

The microcomputer 46 executes the second interruption process for the Phase U Hall signal shown in FIG. 12, in addition to the process of the above-described FIG. 9, every time when the logic level in the Phase U Hall signal HaU changes. With respect also to the Phase V Hall signal HaV and the Phase W Hall signal HaW, the microcomputer 46 executes the same process as the process of FIG. 12, in addition to the process similar to the process in FIG. 9 (that is, the first interruption process for the Phase V Hall signal or the first interruption process for the Phase W Hall signal), every time when the logic level in each of these Hall signals changes. The second interruption process for the Phase V Hall signal executed every time when the logic level in the Phase V Hall signal HaV changes is a process executed for "Phase V" instead of "Phase U" in FIG. 12. Similarly, the second interruption process for the Phase W Hall signal executed every time when the logic level in the Phase W Hall signal HaW changes is a process executed for "Phase W" instead of "Phase U" in FIG. 12. Accordingly, the second interruption process for the Phase U Hall signal will now be described with reference to FIG. 12. It should be noted that the same step numbers as in FIG. 12 are used for the second interruption process for the Phase V Hall signal and the second interruption process for the Phase W Hall signal, and that the second interruption process for the Phase U Hall signal, the second interruption process for the Phase V Hall signal, and the second interruption process for the Phase W Hall signal are collectively referred to as the second interruption process for the respective phases Hall signal.

As shown in FIG. 12, in S710, S720, S740, and S750 of the second interruption process for the Phase U Hall signal, the same process are performed as in S610, S620, S640, and S650 of the interruption process for the Phase U zero-cross signal shown in FIG. 11. As compared to S630 of FIG. 11, the difference is that when the value of the error timer for Phase U and the plus or minus sign of the value of the error timer are associated to each other and stored in the RAM in S730 of the second interruption process for the Phase U Hall signal, a "minus" sign is stored as the plus or minus sign.

Accordingly, the microcomputer 46 executes the second interruption process for the Phase X Hall signal and the interruption process for the Phase X zero-cross signal to measure the time difference TeX between the level change timing of the Phase X Hall signal HaX and the level change timing of the Phase X zero-cross signal ZrX as the value of the error timer for Phase X.

For example, as shown in Row 1 and Row 4 in FIG. 7, when the Phase U Hall signal HaU is shifted toward the advance angle side with respect to the Phase U zero-cross signal ZrU, the second interruption process for the Phase U Hall signal is executed prior to the interruption process for the Phase U zero-cross signal by the time difference TeU.

Accordingly, in the second interruption process for the Phase U Hall signal, the microcomputer 46 makes a negative determination in S710 and clears and starts the error timer for Phase U in S750.

In the interruption process for the Phase U zero-cross signal, the microcomputer 46 makes an affirmative determination in S610 and then stores the value of the error timer for Phase U together with a "plus" sign in the RAM in S630. The value of the error timer for Phase U stored in the RAM in this case is a value obtained by measuring the time difference TeU between the level change timing of the Phase U Hall signal HaU and the level change timing of the Phase U zero-cross signal ZrU (that is, a plus time difference TeU) in which the aforementioned unit time is used as the resolution.

Moreover, for example, as shown in Row 2 and Row 5 in FIG. 7, when the Phase V Hall signal HaV is shifted toward the delay angle side with respect to the Phase V zero-cross signal ZrV, the interruption process for the Phase V zero-cross signal is executed prior to the second interruption process for the Phase V Hall signal by the time difference TeV.

Consequently, the microcomputer 46 makes a negative determination in S610 in the interruption process for the Phase V zero-cross signal and clears and starts the error timer for Phase V in S650.

In the second interruption process for the Phase V Hall signal, the microcomputer 46 makes an affirmative determination in S710 and stores the value of the error timer for Phase V together with the "minus" sign in the RAM in S730. The value of the error timer for Phase V stored in the RAM in this case is a value obtained by measuring the time difference TeV between the level change timing of the Phase V zero-cross signal ZrV and the level change timing of the Phase V Hall signal HaV (that is, a minus time difference TeV) in which the aforementioned unit time is used as the resolution.

The time differences TeU, TeV, and TeW, measured by the second interruption process for the respective phases Hall signal and the interruption process for the respective phases zero-cross signal, are the time lags between the timings when the Hall sensors 23u, 23v, 23w detect the respective rotor positions and the timings when the rotor position detection circuit 50 detects the respective rotor positions. This is achieved by storing the value of the error timer into the RAM as a measurement result, if an affirmative determination is made in S620 or S720.

Going back to the description of the correction value storing process, the microcomputer 46 enables the zero-cross signal interruption in S340, and then determines, in S350, whether the motor rotational speed is equal to a specified minimum speed SL or higher. If it is determined that the motor rotational speed is equal to the minimum speed SL or higher, the process proceeds to S360. The minimum speed SL is lower than the maximum speed SH that is used for the determination in S330. In other words, the maximum speed SH is higher than the minimum speed SL.

The microcomputer 46 determines whether the values of the error timers for all phases are stored in the RAM in S360. If a negative determination is made, that is, a value (or values) of the error timer(s) for some phase(s) is/are not yet stored in the RAM, the process goes back to S320. If the microcomputer 46 determines, in S360, that the values of the error timers for all phases are stored in the RAM, the process proceeds to S370.

Although the processes of S370 to S420 in FIG. 10A and FIG. 10B are executed for each of Phase U, Phase V, and Phase W, the following describes the processes executed for Phase U.

The microcomputer 46 determines, in S370, whether the plus or minus sign for the value of the error timer for Phase U stored in the RAM is "plus". If it is determined to be "plus", the process proceeds to S380. The microcomputer 46 calculates, in S380, the correction value RU for Phase U (that is, the correction value for the Phase U Hall signal HaU) with the following Expression 6.

Correction Value $RU$=Value of Error Timer for Phase $U$/Value of Rotational Speed Timer for Phase $U$    Expression 6

Expression 6 corresponds to the above-described Expression 1. In other words, Expression 6 includes "the value of the error timer for Phase U" as the "time difference TeX" in Expression 1, and "the value of the rotational speed timer for Phase U" as the "half-cycle time TcX" in Expression 1. The correction value RU calculated with Expression 6 is a correction value for correcting the Phase U Hall signal HaU, shifted toward the advance angle side, to be shifted toward the delay angle side (hereinafter referred to as correction value in the delay angle direction).

On the other hand, if the microcomputer 46 determines, in S370, that the plus or minus sign of the value of the error timer for Phase U stored in the RAM is not "plus" (that is, the plus or minus sign is "minus"), the process proceeds to S390.

The microcomputer 46 calculates the correction value RU for Phase U with the following Expression 7 in S390.

$$\text{Correction Value } RU = 1 - \text{value of error timer for Phase } U / \text{value of rotational speed timer for Phase } U \quad \text{Expression 7}$$

Expression 7 corresponds to the above-described Expression 2. In other words, Expression 7 includes the "value of the error timer for Phase U" as the "time difference TeX" in Expression 2, and "the value of the rotational speed timer for Phase U" as the "half-cycle time TcX" in Expression 2. The correction value RU calculated with Expression 7 is a correction value for correcting the Phase U Hall signal HaU, shifted toward the delay angle side, to be shifted toward the advance angle side (hereinafter referred to as correction value in the advance angle direction).

After the microcomputer 46 calculating the correction value RU in S380 or S390, the process proceeds to S400. In S400, it is determined whether the new correction value RU calculated in S380 or S390 this time is within a specified range in order to determine whether the new correction value RU is normal. The specified range is set within a normal range for design (that is, a range that is available in the standpoint of design).

If the microcomputer 46 determines that the new correction value RU is normal in S400, the process proceeds to S410. In S410, by comparing the correction value RU that is already stored in the memory 47 by the process in S420, which will be described later (hereinafter referred to as current correction value RU) and the new correction value RU, it is determined whether the current correction value RU in the memory 47 needs to be updated with the new correction value RU.

Specifically, a difference value between the current correction value RU and the new correction value RU is first calculated. The difference value is an absolute value of the difference between the current correction value RU and the new correction value RU. If one of the current correction value RU and the new correction value RU is for the delay angle direction and the other is for the advance angle direction, regarding the correction value for the advance angle direction, the value obtained by subtracting one from the correction value is used for calculating the difference value. The determination whether the correction value is for the delay angle direction or the advance angle direction can be made, for example, as follows: if the correction value is smaller than the specified value used in the determination in S620 of FIG. 11 and S720 of FIG. 12, the correction value is determined to be for the delay angle direction, while the correction value is equal to or larger than the specified value, the correction value is determined to be for the advance angle direction. In other words, the difference value is an absolute value of the difference between the ratio of the time difference TeU with respect to the half-cycle time TcU represented by the current correction value RU and the ratio of the time difference TeU with respect to the half-cycle time TcU represented by the new correction value RU.

If the calculated difference value is equal to the specified value or larger, the microcomputer 46 determines, in S410, that the update of the current correction value RU is necessary. If the calculated difference value is smaller than the specified value, the microcomputer 46 determines that the update of the current correction value RU is unnecessary. This is because, if the difference value is smaller than the specified value, the current correction value RU and the new correction value RU are considered to be substantially the same. "Substantially the same" means that, even some difference exists, the difference is such that, when the current correction value RU is used for controlling the motor 16, the difference does not affect to the control accuracy. Alternatively, it may be determined that if, in S410, the current correction value RU and the new correction value RU are not the same, the update of the current correction value RU is necessary, and if the current correction value RU and the new correction value RU are the same, the update of the current correction value RU is unnecessary.

If the microcomputer 46 determines that the update of the current correction value RU is necessary in S410, the process proceeds to S420 in which the current correction value RU in the memory 47 is rewritten to the new correction value RU for the update of the correction value RU. Then, the process proceeds to S430. On the other hand, if the microcomputer 46 determines that the update of the current correction value RU is unnecessary in S410, the process proceeds directly to S430 without the process of S420 being executed.

If the correction value RU is not yet stored in the memory 47, it is determined, in S400, that the new correction value RU is normal, and that, in S410, the update of the current correction value RU is necessary. In this case, the new correction value RU is stored in the memory 47 for the first time in S420.

In S430, the microcomputer 46 determines whether the processes of S370 to S420 have finished for all phases. If it is determined that the processes have not yet finished, the process goes back to S370. In this case, the microcomputer 46 executes the processes of S370 to S420 for the remaining phase(s). In S430, if the microcomputer 46 determines that the processes of S370 to S420 have finished for all phases, the process proceeds to S450.

In S400, if the microcomputer 46 determines that the new correction value RU is not normal, the process proceeds to S440 in which an alert process is executed to alert the user to an abnormality that might have caused in some part such as Hall sensors 23u, 23v, 23w, the rotor position detection circuit 50, or signal wiring. Then the process proceeds to S450. In the alert process, an LED 34 is turned on in a specified pattern. The alert process may include, for example, a sound alert with a buzzer, or, if the display panel 32 is provided with a display device, a message alert in which a message indicating the occurrence of an abnormality is shown on the display device.

If the microcomputer 46 determines, in S350, that the motor rotational speed is not equal to the minimum speed SL or higher (in other words, lower than the minimum speed SL), the process proceeds directly to S450. The microcomputer 46 disables the Hall signal interruption in S450, and the zero-cross signal interruption in S460.

Subsequently in S470, the microcomputer 46 stops each of the error timers and clears the value of the each error timers to zero. Furthermore, the microcomputer 46 stops each of the rotational speed timers in S480 and clears the value of the each rotational speed timers to zero. Then, the correction value storing process ends, which in turn ends the motor control process.

If the microcomputer 46 determines, in S320, that the trigger switch 29 is not off (that is, on), the process proceeds to S490 in which the zero-cross signal interruption is disabled. Then, the microcomputer 46 stops each of the error timers in S500 and clears the value of the each of the error timers to zero. Subsequently, in S510, the process jumps to the beginning of the motor control process (that is, S110 in FIG. 8). In this case, the motor 16 is driven again.

The above-described processes <1> to <3> are performed by the microcomputer 46 executing the processes described with reference to FIGS. 8 to 12.

[Effect]

In the trimmer 2 according to the present embodiment, the microcomputer 46 executes, when the motor 16 is inertially rotated, the second interruption process for the respective phases Hall signal and the interruption process for the respective phases zero-cross signal. By executing these processes, the microcomputer 46 measures the respective time differences (i.e., TeU, TeV, or TeW) between the level change timings of the Hall signals HaU, HaV, HaW and the level change timings of the zero-cross signals ZrU, ZrV, ZrW as the values of the error timers. The measured time differences TeU, TeV, TeW correspond to the respective differences between the detection results of the rotor position obtained by the Hall sensors 23u, 23v, 23w and the detection results of the rotor position obtained by the rotor position detection circuit 50.

Moreover, by executing the processes S370 to S390 of FIG. 10A, the microcomputer 46 calculates the correction values RU, RV, RW for correcting the respective detection results of the rotor position obtained by the Hall sensors 23u, 23v, 23w from the values of the error timers for the respective phases. The values of the error timers respectively correspond to the measurement results of the time differences TeU, TeV, TeW. The microcomputer 46 also stores the correction values RU, RV, RW in the memory 47 in S420 of FIG. 10B.

When the motor 16 is inertially rotated, the level change timings in the zero-cross signals ZrU, ZrV, ZrW that correspond to the detection results of the rotor position obtained by the rotor position detection circuit 50 indicate the correct rotor position. Thus, the correction values RU, RV, RW stored in the memory 47 can correct the respective detection results of the rotor position obtained by the Hall sensors 23u, 23v, 23w (that is, the level change timings in the Hall signals HaU, HaV, HaW) with a good accuracy.

Consequently, the microcomputer 46 can accurately correct the level change timings of Hall signals HaU, HaV, HaW with the respective correction values RU, RV, RW in the memory 47 by the first interruption process for the respective phases Hall signal and the processes in S150 to S170 of FIG. 8. The microcomputer 46 performs excitation switching, in S170 of FIG. 8, at such corrected level change timings, and therefore can improve the accuracy in controlling the motor 16.

Moreover, as described above, the time differences TeU, TeV, TeW measured by the second interruption process for the respective phases Hall signal and the interruption process for the respective phases zero-cross signal are the time lags between the timings when the Hall sensors 23u, 23v, 23w detect the respective rotor positions and the timings when the rotor position detection circuit 50 detects the respective rotor positions. In the present embodiment, the time lags are dealt as differences between the detection results of the rotor position obtained by the Hall sensors 23u, 23v, 23w and the respective detection results of the rotor position obtained by the rotor position detection circuit 50 (that is, detection errors of the Hall sensors 23u, 23v, 23w). Consequently, the detection errors caused by the Hall sensors 23u, 23v, 23w can be easily detected, which in turn enables to simplify the process for calculating the correction values RU, RV, RW.

Furthermore, if the microcomputer 46 determines, in S350 of FIG. 10A, that the motor rotational speed is lower than the minimum speed SL the Hall signal interruption and the zero-cross signal interruption are disabled in S450 and S460. In other words, when the motor rotational speed is equal to the minimum speed SL or higher, the microcomputer 46 executes the second interruption process for the respective phases Hall signal and the interruption process for the respective phases zero-cross signal to detect the time differences TeU, TeV, TeW. This is because, if the motor rotational speed is too low, the amplitude of the induced voltages generated in the coils 41u, 41v, 41w becomes small, and thereby the accuracy in the zero-cross signals ZrU, ZrV, ZrW based on the induced voltages decreases. Therefore, by detecting the time differences TeU, TeV, TeW when the motor rotational speed is equal to the minimum speed SL or higher, the accuracy in the correction values RU, RV, RW calculated based on the time differences TeU, TeV, TeW can be improved.

Still furthermore, if the microcomputer 46 determines, in S330 of FIG. 10A, that the motor rotational speed is equal to the maximum speed SH or lower, the microcomputer 46 enables the zero-cross signal interruption in S340. In other words, when the motor rotational speed is equal to the minimum speed SL or higher and also equal to the maximum speed SH or lower, the microcomputer executes the second interruption process for the respective phases Hall signal and the interruption process for the respective phases zero-cross signal to detect the time differences TeU, TeV, TeW. This is because, if the motor rotational speed is too high, the change rates of induced voltages generated in the coils 41u, 41v, 41w become large which in turns decreases the accuracy in the zero-cross signals ZrU, ZrV, ZrW. Accordingly, by detecting the time differences TeU, TeV, TeW when the motor rotational speed is in the range from the minimum speed SL to the maximum speed SH, the accuracy of the correction values RU, RV, RW calculated based on the time differences TeU, TeV, TeW can be further improved. The range from the minimum speed SL to the maximum speed SH may be set in any suitable range where the accuracy of the zero-cross signals ZrU, ZrV, ZrW is good.

Moreover, the microcomputer 46 compares the correction value in the memory 47 with a newly calculated correction value in S410 of FIG. 10B, and determines whether the update of the correction value in the memory 47 is necessary. If the microcomputer 46 determines that the update is necessary, the newly calculated correction value is overwritten on the correction value in the memory 47. This enables to reduce the process load to rewrite the correction value in the memory 47 and the number of rewriting the memory 47. The correction value in the memory 47 can be updated only when the correction value significantly changes due to, for example, replacement of the motor 16.

Moreover, the microcomputer 46 determines, in S400 of FIG. 10B, whether the newly calculated correction value is normal depending on whether the newly calculated correction value is in the specified range. When it is determined that the newly calculated correction value is not normal, the microcomputer 46 executes the alert process in S440 of FIG. 10B.

Accordingly, if abnormality is caused in some part, for example, the Hall sensors 23u, 23v, 23w, the rotor position detection circuit 50, the signal wirings, and so on, and the newly calculated correction value becomes an abnormal value, the occurrence of the abnormality can be detected and alerted to the user. Consequently, the user can be encouraged to repair the trimmer 2.

In the present embodiment, the rotor position detection circuit 50 corresponds to one example of the detector. The microcomputer 46 serves as one example of each of the calculator, the memory processor, the motor controller, the update determiner, and the abnormality detector. S130 of FIG. 8, S310 to S390 of FIG. 10A, S450 and S460 of FIG. 10B, and the interruption process for the respective phases zero-cross signal including the interruption process for the Phase U zero-cross signal of FIG. 11 and the second interruption process for the respective phases Hall signal including the second interruption process for the Phase U Hall signal of FIG. 12 correspond to one example of the process of the calculator. Moreover, S420 of FIG. 10B corresponds to one example of the process of the memory processor. S150 to S170 of FIG. 8 and the first interruption process for the respective phases Hall signal including the first interruption process for the Phase U Hall signal of FIG. 9 correspond to one example of the process of the motor controller. S410 of FIG. 10B corresponds to one example of the process of the update determiner. S400 and S440 of FIG. 10B correspond to one example of the process of the abnormality detector.

Other Embodiments

In the above-described embodiment, if the Hall sensors 23u, 23v, 23w do not cause detection errors, the level change timings of the Hall signals HaU, HaV, HaW match the level change timings of the zero-cross signals ZrU, ZrV, ZrW respectively when the motor 16 is inertially rotated. If the assembling positions of the Hall sensors 23u, 23v, 23w in this case are the reference positions, the Hall sensors 23u, 23v, 23w may be assembled in a shifted manner toward the advance angle side or the delay angle side from the reference positions. In the above-described example, by changing the assembling position of the sensor board 17, the assembling positions of the Hall sensors 23u, 23v, 23w can be changed.

Suppose, for example, that the Hall sensors 23u, 23v, 23w are shifted by "α°" in the electrical angle toward the advance angle side from the reference positions and assembled.

In this case, when the motor 16 is inertially rotated, changes in the logic levels of the Hall signals HaU, HaV, HaW respectively take place prior by time Tα for "α°" in the electrical angle to the level change timings of the zero-cross signals ZrU, ZrV, ZrW. In this case, the above-described embodiment may be modified as follows.

Among Phase U, Phase V, and Phase W, Phase U will be described as an example. The microcomputer 46 generates a virtual timing that is time Tα for "α°" in the electrical angle later from the timing for the logic level change of the Phase U Hall signal HaU. The virtual timing can be generated based on the motor rotational speed since the above-described time Tα can be calculated from the motor rotational speed. Then, the microcomputer 46 can execute the second interruption process for the Phase U Hall signal of FIG. 12 at the aforementioned virtual timing. The same applies to Phase V and Phase W.

The above has described embodiments according to the present disclosure. However, the present disclosure is not limited to the above-described embodiments and can be carried out in various ways. Moreover, the above-described values are merely one example, and may be alternatively other values.

For example, the rotational position sensor is not limited to a rotational position sensor with a Hall elements, and may be, for example, a sensor with other magnetoelectric conversion elements such as a magnetoresistance element.

The coupling configuration for coils in the motor 16 is not limited to the star configuration, however, may be other configuration, for example, delta configuration.

The memory 47 that stores correction values may be, for example, a RAM supported by a power supply.

In the above-described embodiment, the trimmer 2 is presented as one example of the electric working machine. The technique of the present disclosure may be applied to other electric working machines used in workplaces for, for example, DIY, manufacturing, gardening, and construction. Specifically, the technique according to the present disclosure may be applied to an electric working machine comprising a brushless motor such as, for example, electric power tools for stone work, metal work, and woodwork, gardening machines, or devices for organizing workplaces. More specifically, the technique according to the present disclosure may be applied to various electric working machines including electric hammers, electric hammer drills, electric drills, electric drivers, electric wrenches, electric grinders, electric circular saws, electric reciprocating saws, electric jigsaws, electric cutters, electric chain saws, electric planes, electric nailguns (including reveting machines), electric hedge trimmers, electric lawn mowers, electric lawn clippers, electric trimmers, electric cleaners, electric blowers, electric atomizers, electric spreaders, electric dust collectors.

The power source of the electric working machine may be an alternating-current power source.

A plurality of functions possessed by one component in the above-described embodiment may be achieved by a plurality of components, or one function possessed by one component may be achieved by a plurality of components. Furthermore, a plurality of functions possessed by a plurality of components may be achieved by one component, or one function achieved by a plurality of components may be achieved by one component. Moreover, the configuration of the above-described embodiment may be partially omitted. Various aspects included in the technical ideas specified by the expressions used in the claims correspond to the embodiments of the present disclosure. Still furthermore, the present disclosure can be achieved by, in addition to the above-described electric working machine, various ways including a system comprising the electric working machine, a program for a computer to function as the electric working machine, a recording medium, such as a semiconductor memory, having this program stored therein, a method for controlling a brushless motor for electric working machine, and a method for correcting rotational position sensors.

What is claimed is:
1. An electric working machine comprising:
a brushless motor comprising a rotor and a stator having a plurality of windings;
a rotational position sensor configured to detect a rotational position of the rotor based on a variation in a magnetic field associated with rotation of the rotor;
a detector configured to detect the rotational position of the rotor based on induced voltages individually generated in each of the plurality of windings; and
a calculator configured to (i) detect a difference between (a) a detection result obtained by the rotational position sensor when the brushless motor is inertially rotated, and (b) a detection result obtained by the detector and (ii) to calculate a correction value, based on the difference, for correcting the detection result obtained by the rotational position sensor.
2. The electric working machine according to claim 1 further comprising a memory processor configured to store the correction value calculated by the calculator in a memory.

3. The electric working machine according to claim 1,
wherein the calculator is configured to detect a time lag, as the difference, between a first timing in which the rotational position sensor detects a specified rotational position of the rotor and a second timing in which the detector detects the specified rotational position when the brushless motor is inertially rotated.

4. The electric working machine according to claim 2 further comprising:
a motor controller configured to control the brushless motor based on the detection result obtained by the rotational position sensor and to correct the detection result obtained by the rotational position sensor with the correction value stored in the memory for controlling the brushless motor.

5. The electric working machine according to claim 1,
wherein the calculator is configured to detect the difference if rotational speed of the brushless motor is equal to a specified minimum speed or higher.

6. The electric working machine according to claim 5,
wherein the calculator is configured to detect the difference if the rotational speed of the brushless motor is equal to the minimum speed or higher and additionally equal to a specified maximum speed or lower, the maximum speed being higher than the minimum speed.

7. The electric working machine according to claim 2 further comprising:
an update determiner configured to compare the correction value in the memory and the correction value newly calculated by the calculator and to determine whether to update the correction value in the memory,
wherein the memory processor is configured to update the correction value in the memory with the correction value newly calculated if the update determiner determines to update the correction value in the memory.

8. The electric working machine according to claim 1 further comprising:
an abnormality detector configured to determine, based on whether the correction value calculated by the calculator is within a specified range, whether the correction value calculated is normal and, if the correction value calculated is determined not to be normal, to perform a process to alert a user of the electric working machine to occurrence of an abnormality.

9. A method for detecting a rotational position of a rotor of a brushless motor for an electric working machine, the brushless motor comprising the rotor and a stator having a plurality of windings, the method comprising:
detecting a rotational position of the rotor based on variation in a magnetic field associated with rotation of the rotor;
detecting the rotational position of the rotor based on induced voltages individually generated in each of the plurality of windings;
detecting a difference between a detection result based on the variation in the magnetic field when the brushless motor is inertially rotated and a detection result based on the induced voltages; and
calculating a correction value to correct the detection result based on the variation in the magnetic field based on the difference.

10. The electric working machine according to claim 1,
wherein the calculator is further configured to switch off electric conduction to the brushless motor that is being rotationally driven to thereby inertially rotate the brushless motor.

11. The electric working machine according to claim 10, further comprising:
a trigger switch configured to be operated in order to drive the brushless motor,
wherein the calculator is configured to switch off electric conduction to the brushless motor that is being rotationally driven, in response to the trigger switch being turned off.

12. The method according to claim 9, further comprising:
switching off electric conduction to the brushless motor that is being rotationally driven.

13. The method according to claim 12, further comprising:
turning off a trigger switch for the electric working machine in order to switching off electric conduction to the brushless motor that is being rotationally driven, the trigger switch being configured to be operated in order to drive the brushless motor.

* * * * *